US011845465B2

(12) United States Patent
Kim et al.

(10) Patent No.: US 11,845,465 B2
(45) Date of Patent: Dec. 19, 2023

(54) AUTONOMOUS LATERAL CONTROL OF VEHICLE USING DIRECT YAW MOMENT CONTROL

(71) Applicant: Canoo Technologies Inc., Torrance, CA (US)

(72) Inventors: Kilsoo Kim, Redondo Beach, CA (US); Jongmoo Choi, Gardena, CA (US); Vishal U. Shanbhag, Torrance, CA (US); Lung En Jan, Alhambra, CA (US); Aviral K. Singh, Torrance, CA (US); Paolo E. Pucci, Redondo Beach, CA (US)

(73) Assignee: Canoo Technologies Inc., Torrance, CA (US)

( * ) Notice: Subject to any disclaimer, the term of this patent is extended or adjusted under 35 U.S.C. 154(b) by 100 days.

(21) Appl. No.: 17/449,413

(22) Filed: Sep. 29, 2021

(65) Prior Publication Data

US 2023/0102778 A1     Mar. 30, 2023

(51) Int. Cl.
*B60W 60/00* (2020.01)

(52) U.S. Cl.
CPC ..... *B60W 60/001* (2020.02); *B60W 2520/125* (2013.01); *B60W 2520/14* (2013.01); *B60W 2520/30* (2013.01)

(58) Field of Classification Search
None
See application file for complete search history.

(56) References Cited

U.S. PATENT DOCUMENTS

| 5,711,024 A | 1/1998 | Wanke |
| 8,527,172 B2 | 9/2013 | Moshchuk et al. |
| 8,647,763 B2 | 2/2014 | Tennessen et al. |

(Continued)

FOREIGN PATENT DOCUMENTS

| CN | 113273016 A | 8/2021 |
| DE | 102006059989 A1 | 6/2008 |

(Continued)

OTHER PUBLICATIONS

Mangia et al., "An integrated torque-vectoring control framework for electric vehicles featuring multiple handling and energy efficiency models selectable by the driver," Meccanica, Mar. 2021, 20 pages.

(Continued)

*Primary Examiner* — James M McPherson

(57) ABSTRACT

A method includes identifying a path to be followed by an ego vehicle. The method also includes determining a desired yaw rate and a desired yaw acceleration for the ego vehicle based on the identified path. The method further includes determining a desired yaw moment for the ego vehicle based on the desired yaw rate and the desired yaw acceleration. In addition, the method includes distributing the desired yaw moment to multiple wheels of the ego vehicle such that the distributed desired yaw moment creates lateral movement of the ego vehicle during travel along the identified path. In some cases, the desired yaw rate and the desired yaw acceleration for the ego vehicle may be determined based on nonlinear kinematics of the ego vehicle, and the desired yaw moment for the ego vehicle may be determined based on a single-track dynamic model of the ego vehicle.

22 Claims, 11 Drawing Sheets

(56) References Cited

U.S. PATENT DOCUMENTS

| | | | |
|---|---|---|---|
| 8,825,335 | B2 | 9/2014 | Rylander |
| 8,989,981 | B2 | 3/2015 | Yamakado et al. |
| 9,278,713 | B2 | 3/2016 | Moshchuk et al. |
| 9,487,139 | B1* | 11/2016 | Ishida .................. B60W 50/16 |
| 9,701,307 | B1 | 7/2017 | Newman et al. |
| 9,912,023 | B1 | 3/2018 | Mastrandrea et al. |
| 10,829,153 | B1* | 11/2020 | Taniguchi ............ B62D 15/021 |
| 2004/0128042 | A1 | 7/2004 | Takahashi et al. |
| 2004/0176899 | A1* | 9/2004 | Hallowell ................. B60T 7/12 |
| 2004/0262991 | A1 | 12/2004 | Anwar |
| 2006/0086556 | A1 | 4/2006 | Matsuno |
| 2008/0299448 | A1 | 12/2008 | Buck et al. |
| 2010/0104938 | A1 | 4/2010 | Hermann |
| 2010/0212338 | A1 | 8/2010 | Hermann et al. |
| 2011/0293998 | A1 | 12/2011 | Sato et al. |
| 2012/0107663 | A1 | 5/2012 | Burgers et al. |
| 2013/0004820 | A1 | 1/2013 | Tennessen et al. |
| 2016/0118700 | A1 | 4/2016 | Perumalla et al. |
| 2017/0005377 | A1 | 1/2017 | Rong |
| 2017/0092999 | A1 | 3/2017 | Tarlau et al. |
| 2017/0279172 | A1 | 9/2017 | Tucker |
| 2017/0301964 | A1 | 10/2017 | Murakami et al. |
| 2017/0352931 | A1 | 12/2017 | Yoshida et al. |
| 2017/0358833 | A1 | 12/2017 | Jalilevand et al. |
| 2018/0145382 | A1 | 5/2018 | Harris et al. |
| 2018/0297594 | A1* | 10/2018 | Takahashi ............. B60W 10/04 |
| 2018/0359877 | A1 | 12/2018 | Wang et al. |
| 2019/0176801 | A1* | 6/2019 | Ruybal .................... B60K 6/52 |
| 2019/0276039 | A1* | 9/2019 | Kambe ................ B60W 40/114 |
| 2020/0079391 | A1 | 3/2020 | Jonasson et al. |
| 2020/0216085 | A1 | 7/2020 | Bobier-Tiu et al. |
| 2020/0220132 | A1 | 7/2020 | Bourke et al. |
| 2020/0290668 | A1 | 9/2020 | Moreillon et al. |
| 2021/0139016 | A1 | 5/2021 | Horiguchi et al. |
| 2021/0323551 | A1 | 10/2021 | Kvieska et al. |
| 2022/0144249 | A1* | 5/2022 | Do ........................ B60W 10/20 |
| 2022/0396259 | A1* | 12/2022 | Balachandran ....... B60W 30/02 |
| 2023/0022906 | A1* | 1/2023 | Balachandran ....... B60W 10/20 |
| 2023/0026238 | A1* | 1/2023 | Arima .................... B62D 6/003 |
| 2023/0105572 | A1* | 4/2023 | Asadi ................. B60W 40/109 |
| | | | 701/41 |

FOREIGN PATENT DOCUMENTS

| | | |
|---|---|---|
| RU | 2339125 C1 | 11/2008 |
| WO | 2020146419 A1 | 7/2020 |

OTHER PUBLICATIONS

International Search Report and Written Opinion of the International Searching Authority dated Dec. 5, 2022 in connection with International Patent Application No. PCT/US2022/076959, 11 pages.

International Search Report and Written Opinion of the International Searching Authority dated Nov. 23, 2022 in connection with International Patent Application No. PCT/US2022/076958, 9 pages.

Non-Final Office Action dated Mar. 25, 2020 in connection with U.S. Appl. No. 16/736,698, 19 pages.

Notice of Allowance dated Aug. 24, 2020 in connection with U.S. Appl. No. 16/736,698, 11 pages.

Notice of Allowance dated Dec. 2, 2020 in connection with U.S. Appl. No. 16/736,698, 3 pages.

International Search Report and Written Opinion of the International Searching Authority dated Apr. 16, 2020 in connection with International Patent Application No. PCT/US20/12619, 7 pages.

International Preliminary Report on Patentability dated Jul. 22, 2021 in connection with International Patent Application No. PCT/US20/12619, 6 pages.

Guo et al., "Coordinated path-following and direct yaw-moment control of autonomous electric vehicles with sideslip angle estimation", Mechanical Systems and Signal Processing, Dec. 2017, 17 pages.

Feng et al., "Estimation of Lead Vehicle Kinematics Using Camera-Based Data for Driver Distraction Detection", International Journal of Automotive Engineering, vol. 9, No. 3, 2018, 7 pages.

Wang et al., "Map-Enhanced Ego-Lane Detection in the Missing Feature Scenarios", Apr. 2020, 10 pages.

Kim et al., "Path Tracking Control for Self-Driving of Vehicle With Yaw Moment Distribution", U.S. Appl. No. 17/449,419, filed Sep. 29, 2021, 49 pages.

Kim et al., "Emergency Motion Control for Vehicle Using Steering and Torque Vectoring", U.S. Appl. No. 17/449,426, filed Sep. 29, 2021, 38 pages.

Non-Final Office Action dated Mar. 15, 2023 in connection with U.S. Appl. No. 17/449,426, 18 pages.

International Search Report and Written Opinion of the International Searching Authority dated Dec. 28, 2022, in connection with International Patent Application No. PCT/US2022/077057, 11 pages.

Non-Final Office Action dated Jun. 6, 2023 in connection with U.S. Appl. No. 17/449,419,18 pages.

Notice of Allowance dated Jun. 22, 2023 in connection with U.S. Appl. No. 17/449,426, 8 pages.

Notice of Allowance dated Sep. 20, 2023 in connection with U.S. Appl. No. 17/449,419, 14 pages.

* cited by examiner

AUTONOMOUS LATERAL CONTROL OF VEHICLE USING DIRECT YAW MOMENT CONTROL

TECHNICAL FIELD

This disclosure relates generally to autonomous systems. More specifically, this disclosure relates to autonomous lateral control of a vehicle using direct yaw moment control.

BACKGROUND

Advanced driving assist system (ADAS) features use automated technology to assist a vehicle's operator in driving and parking and form a foundation for autonomous driving (AD). Lateral control of an ego vehicle's position within a traffic lane is one example of an ADAS or AD feature that can be implemented for the ego vehicle, where the ego vehicle refers to the vehicle on which one or more sensors used for ADAS, AD, or other features are mounted. For example, lateral control may be used to help keep an ego vehicle at or near the center of a traffic lane during travel within the traffic lane (referred to as "lane centering"), to help keep an ego vehicle within a traffic lane during travel (referred to as "lane keeping"), or to cause an ego vehicle to move from one traffic lane to another traffic lane (referred to as "lane changing"). Lateral control may also be used to control an ego vehicle in order to avoid a potential impact, such as by applying emergency braking or evasive steering in order to avoid another vehicle or other object within the traffic lane of the ego vehicle.

SUMMARY

This disclosure relates to autonomous lateral control of a vehicle using direct yaw moment control.

In a first embodiment, a method includes identifying a path to be followed by an ego vehicle. The method also includes determining a desired yaw rate and a desired yaw acceleration for the ego vehicle based on the identified path. The method further includes determining a desired yaw moment for the ego vehicle based on the desired yaw rate and the desired yaw acceleration. In addition, the method includes distributing the desired yaw moment to multiple wheels of the ego vehicle such that the distributed desired yaw moment creates lateral movement of the ego vehicle during travel along the identified path.

In a second embodiment, an apparatus includes at least one processing device configured to identify a path to be followed by an ego vehicle. The at least one processing device is also configured to determine a desired yaw rate and a desired yaw acceleration for the ego vehicle based on the identified path. The at least one processing device is further configured to determine a desired yaw moment for the ego vehicle based on the desired yaw rate and the desired yaw acceleration. In addition, the at least one processing device is configured to distribute the desired yaw moment to multiple wheels of the ego vehicle such that the distributed desired yaw moment creates lateral movement of the ego vehicle during travel along the identified path.

In a third embodiment, a non-transitory machine-readable medium contains instructions that when executed cause at least one processor to identify a path to be followed by an ego vehicle. The medium also contains instructions that when executed cause the at least one processor to determine a desired yaw rate and a desired yaw acceleration for the ego vehicle based on the identified path. The medium further contains instructions that when executed cause the at least one processor to determine a desired yaw moment for the ego vehicle based on the desired yaw rate and the desired yaw acceleration. In addition, the medium contains instructions that when executed cause the at least one processor to distribute the desired yaw moment to multiple wheels of the ego vehicle such that the distributed desired yaw moment creates lateral movement of the ego vehicle during travel along the identified path.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
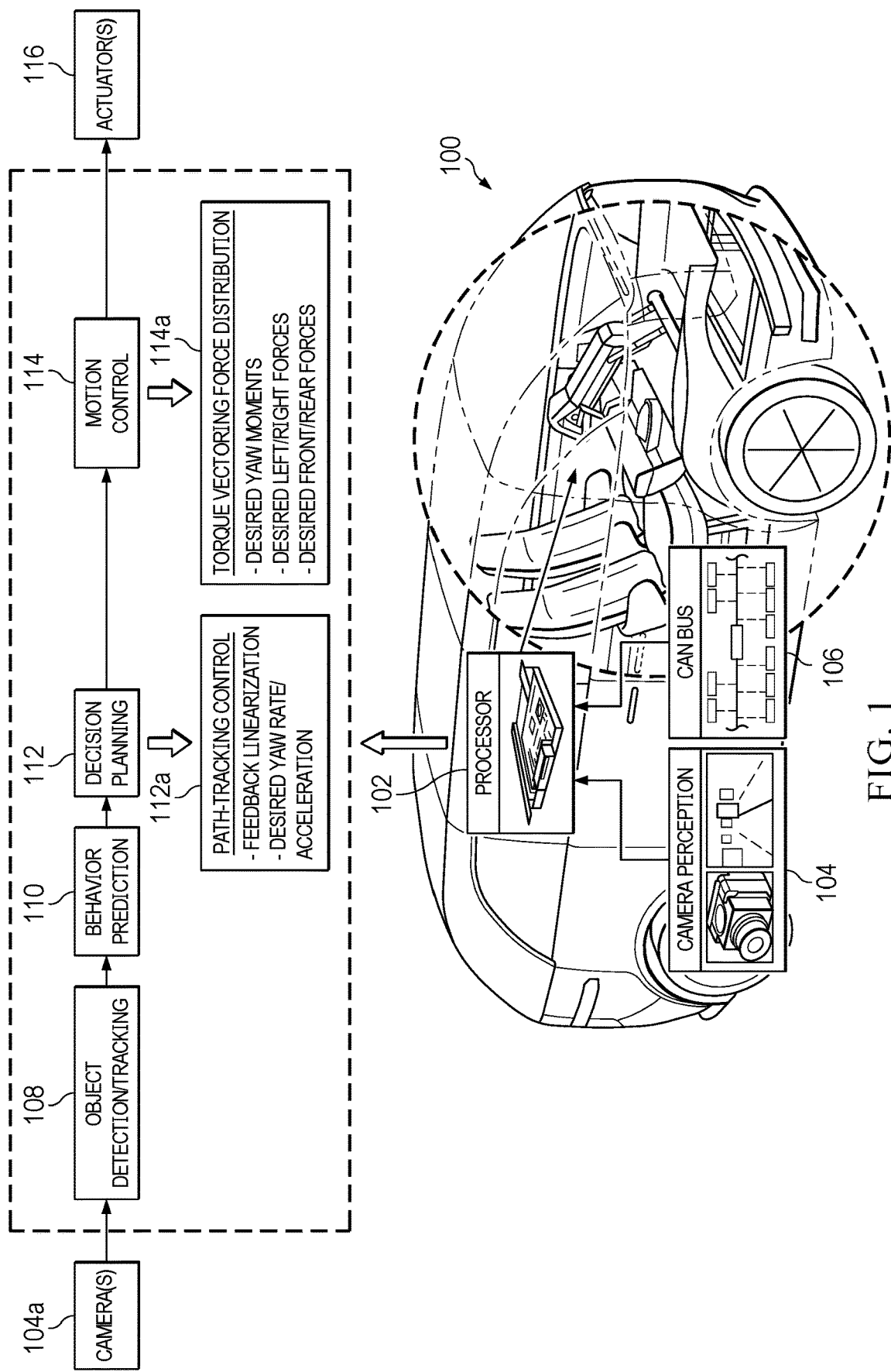
FIG. 1 illustrates an example system supporting autonomous lateral control of a vehicle using direct yaw moment control according to this disclosure.

FIGS. 1 through 11, described below, and the various embodiments used to describe the principles of this disclosure are by way of illustration only and should not be construed in any way to limit the scope of this disclosure.

Those skilled in the art will understand that the principles of this disclosure may be implemented in any type of suitably arranged device or system.

As noted above, advanced driving assist system (ADAS) features use automated technology to assist a vehicle's operator in driving and parking and form a foundation for autonomous driving (AD). Lateral control of an ego vehicle's position within a traffic lane is one example of an ADAS or AD feature that can be implemented for the ego vehicle, where the ego vehicle refers to the vehicle on which one or more sensors used for ADAS, AD, or other features are mounted. For example, lateral control may be used to help keep an ego vehicle at or near the center of a traffic lane during travel within the traffic lane (referred to as "lane centering"), to help keep an ego vehicle within a traffic lane during travel (referred to as "lane keeping"), or to cause an ego vehicle to move from one traffic lane to another traffic lane (referred to as "lane changing"). Lateral control may also be used to control an ego vehicle in order to avoid a potential impact, such as by applying emergency braking or evasive steering in order to avoid another vehicle or other object within the traffic lane of the ego vehicle.

In a vehicle with a conventional internal combustion engine, a drivetrain of the vehicle is used to distribute power from the engine to the wheels of the vehicle, and the drivetrain typically includes a differential gear train that helps to distribute the power to left and right wheels of the vehicle while allowing those wheels to turn at different rates. In electric vehicles, the configuration of the powertrain is far more flexible since electric vehicles may include various numbers of motor configurations. Example motor configurations can include one motor in front, one motor in back, multiple motors in front, multiple motors in back, or any suitable combination thereof. In some cases, each individual wheel of an electric vehicle can have its own independent powertrain. Among other things, these various motor configurations permit different ways of providing "torque vectoring," which refers to the ability to cause a vehicle to move laterally (left or right) by controlling the torques applied to different wheels of the vehicle (rather than turning the vehicle's steering wheel). Torque vectoring is performed by applying different torques to left and right wheels of a vehicle, which causes the vehicle to move laterally in the direction of the wheel having the lower torque.

In one aspect, this disclosure provides techniques for processing information (such as an estimated path to be taken by an ego vehicle, full nonlinear kinematics of the ego vehicle, and a single-track dynamic model) to identify how to perform actuation of torque vectoring in order to follow the estimated path. As described in more detail below, the estimated path to be taken by the ego vehicle can be determined in any suitable manner, such as by using information from a vision system (like one or more cameras) and by performing motion planning. The actuation of torque vectoring can then be based on the estimated path of the ego vehicle in order to achieve desired lateral control of the ego vehicle using the torque vectoring. Among other things, this may allow the torque vectoring actuation to be tied to lane perception information of lateral offset, heading offset, curvature, rate of curvature, or other information. For example, a desired yaw rate and a desired yaw acceleration for the ego vehicle can be determined, and a desired yaw moment for the ego vehicle can be determined based on the desired yaw rate and the desired yaw acceleration. The desired yaw moment can then be distributed to multiple wheels of the ego vehicle, and this distribution can depend on the actual configuration of the ego vehicle. Overall, this allows the desired yaw moment to be converted to different wheel torques for different wheels of the ego vehicle, thereby implementing the desired torque vectoring actuation and enabling autonomous lateral control of the ego vehicle.

In another aspect, this disclosure provides techniques for implementing path tracking control during self-driving, which can be achieved via suitable yaw moment distributions. As described in more detail below, a determined yaw moment for an ego vehicle can often be implemented in a number of ways due to the various possible configurations of the ego vehicle, meaning the ego vehicle may represent an "over-actuated" system. For example, path tracking may be implemented by changing the actual steering direction of the ego vehicle or by using braking systems, energy regeneration systems, and/or motor control to provide torque vectoring within the ego vehicle. The specific mechanism or mechanisms used to provide path tracking in an ego vehicle at a given point in time may be selected based on one or more criteria, such as an estimated response time for achieving a desired lateral movement of the ego vehicle and an energy efficiency that may be obtained during the desired lateral movement of the ego vehicle. As a particular example, lane centering, lane keeping, and lane changing may often involve slower actuation (so torque vectoring may be used), while evasive steering may often involve much faster actuation (so steering changes may be used). This allows the desired yaw moment to be distributed to one or more systems of the ego vehicle in an improved or optimal manner.

FIG. 1 illustrates an example system 100 supporting autonomous lateral control of a vehicle using direct yaw moment control according to this disclosure. In this particular example, the system 100 takes the form of an automotive vehicle, such as an electric vehicle. However, any other suitable system may support autonomous lateral control, such as other types of vehicles, autonomous robots, or other systems.

As shown in FIG. 1, the system 100 includes at least one processor 102 configured to control one or more operations of the system 100. In this example, the processor 102 may interact with one or more sensors 104 and with one or more components coupled to a bus 106. In this particular example, the one or more sensors 104 include one or more cameras or other imaging sensors, and the bus 106 represents a controller area network (CAN) bus. However, the processor 102 may interact with any additional sensor(s) and communicate over any other or additional bus(es).

In this example, the sensors 104 include one or more cameras 104a that generate images (such as visual or infrared images) of scenes around the system 100. Other or additional types of sensors that could be used here include one or more radio detection and ranging (RADAR) sensors, light detection and ranging (LIDAR) sensors, other types of imaging sensors, or inertial measurement units (IMUs). In general, any suitable type(s) of sensor(s) 104 may be used to collect information for processing by the system 100, and this disclosure is not limited to any specific type(s) of sensor(s) 104. Measurements or other data from the sensors 104 are used by the processor 102 or other component(s) as described below to generate a prediction of the estimated path of the system 100, such as to identify the estimated path of a vehicle traveling in a traffic lane, and to control the movements of the system 100 along the estimated path. In some cases, the sensors 104 may include a single camera 104a, such as one camera positioned on the front of a vehicle. In other cases, the sensors 104 may include multiple cameras 104a, such as one camera positioned on the front of a vehicle, one camera positioned on the rear of the vehicle, and two cameras positioned on opposite sides of the vehicle.

The processor 102 can process the information from the sensors 104 in order to detect objects around or proximate to the system 100, such as one or more vehicles, obstacles, or people near the system 100. The processor 102 can also process the information from the sensors 104 in order to perceive lane-marking lines or other markings on a road, floor, or other surface. The processor 102 can further use various information to generate predictions associated with the system 100, such as to predict the future path(s) of the system 100 or other vehicles, identify a center of a traffic lane in which the system 100 is traveling, or predict the future locations of objects around the system 100. As described below, the predicted or desired path of the system 100 can be used to implement direct yaw moment control of the system 100, which thereby enables autonomous lateral control of the system 100.

In this example, the processor 102 performs an object detection/tracking function 108, which generally involves identifying objects around the system 100 in a real-time manner based on information from the sensor(s) 104. For example, the object detection/tracking function 108 can use images from one or more cameras 104a or other sensor information to identify external objects around the system 100, such as other vehicles moving around or towards the system 100 or pedestrians or objects near the system 100. The object detection/tracking function 108 can also identify one or more characteristics of each of one or more detected objects, such as an object class (a type of object) and a boundary (such as a bounding box) around the detected object. The object detection/tracking function 108 can further track one or more of the detected objects over time, such as by collecting position information or other information associated with the same object at different times. The object detection/tracking function 108 can output information identifying each detected object and its associated characteristic(s). The object detection/tracking function 108 can use any suitable technique to perform object detection and tracking, such as by using a trained machine learning model.

The processor 102 also performs a behavior prediction function 110, which generally involves using information to predict the behavior of the system 100 itself and possibly to predict the behavior of one or more detected objects. For example, the behavior prediction function 110 may use information about lane-marking lines, positions of other objects, and other information to estimate the future path of the system 100. As particular examples, the behavior prediction function 110 may use this or other information to identify an estimated path of the system 100 to be followed in order to keep the system 100 within or centered in a current traffic lane or to move the system 100 from one traffic lane to another traffic lane. The behavior prediction function 110 may also merge information associated with detected objects, such as by combining measurements or other information about the same detected objects, and estimate the future position(s) of each detected object relative to the system 100. For instance, the behavior prediction function 110 may generate a polynomial identifying the expected path to be taken by the system 100 and a polynomial identifying the expected path to be taken by another vehicle near the system 100. The behavior prediction function 110 can use any suitable technique to perform behavior prediction, such as by using a curve fitting or filtering algorithm to estimate the path of the system 100 or a detected object.

Information from the behavior prediction function 110 (and possibly information from one or more other sources) may be provided to a decision planning function 112, which generally uses this information to determine how to adjust the operation of the system 100. For example, the decision planning function 112 may determine whether (and how) to change the steering direction of the ego vehicle (the system 100), whether (and how) to apply the brakes or accelerate the vehicle, or whether (and how) to trigger an audible, visible, haptic, or other warning. The warning may indicate that the system 100 is near another vehicle, obstacle, or person, is departing from a current traffic lane in which the vehicle is traveling, or is approaching a possible impact location with another vehicle, obstacle, or person. In general, the identified adjustments determined by the decision planning function 112 can vary widely based on the specific application.

The decision planning function 112 can interact with one or more control functions 114, each of which can be used to adjust or control the operation of one or more actuators 116 in the system 100. For example, in an automotive vehicle, the one or more actuators 116 may represent one or more brakes, electric motors, or steering components of the vehicle, and the control function(s) 114 can be used to apply or discontinue application of the brakes, speed up or slow down the electric motors, or change the steering direction of the vehicle. In general, the specific ways in which the operations of the system 100 can vary depend on the specific system 100 being used.

In this example, the decision planning function 112 performs a path-tracking control function 112a, which is generally used to determine a desired path of the system 100 and how the desired path may be followed by the system 100. For example, the path-tracking control function 112a can use feedback linearization and determine the desired yaw rate and yaw acceleration that may be needed to keep the system 100 traveling along a desired path. Example operations performed by the path-tracking control function 112a are provided below. Also, in this example, the one or more control functions 114 include a torque vectoring force distribution function 114a, which is generally used to determine how to perform torque vectoring via direct yaw moment control based on the desired yaw rate and yaw acceleration. For instance, the torque vectoring force distribution function 114a can identify one or more yaw moments based on the desired yaw rate and yaw acceleration and determine the right/left and front/rear forces to be used to provide the one or more yaw moments. The torque vectoring force distribution function 114a can then cause the torque vectoring to occur in the identified manner, which will ideally keep the system 100 traveling along the desired path. Example operations performed by the torque vectoring force distribution function 114a are provided below.

Note that the functions 108-114 shown in FIG. 1 and described above may be implemented in any suitable manner in the system 100. For example, in some embodiments, various functions 108-114 may be implemented or supported using one or more software applications or other software instructions that are executed by at least one processor 102. In other embodiments, at least some of the functions 108-114 can be implemented or supported using dedicated hardware components. In general, the functions 108-114 described above may be performed using any suitable hardware or any suitable combination of hardware and software/firmware instructions.

The processor 102 itself may also be implemented in any suitable manner, and the system 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108-114 described above. This may allow, for instance, the processor(s) 102 to be used to process information and perform common tasks or different tasks in parallel.

Although FIG. 1 illustrates one example of a system 100 supporting autonomous lateral control of a vehicle using direct yaw moment control, various changes may be made to FIG. 1. For example, various functions and components shown in FIG. 1 may be combined, further subdivided, replicated, omitted, or rearranged and additional functions and components may be added according to particular needs. Also, as noted above, the functionality for autonomous lateral control of a vehicle based on direct yaw moment control may be used in any other suitable system, and the system may or may not relate to automotive vehicles or other vehicles.

Figure 2A:
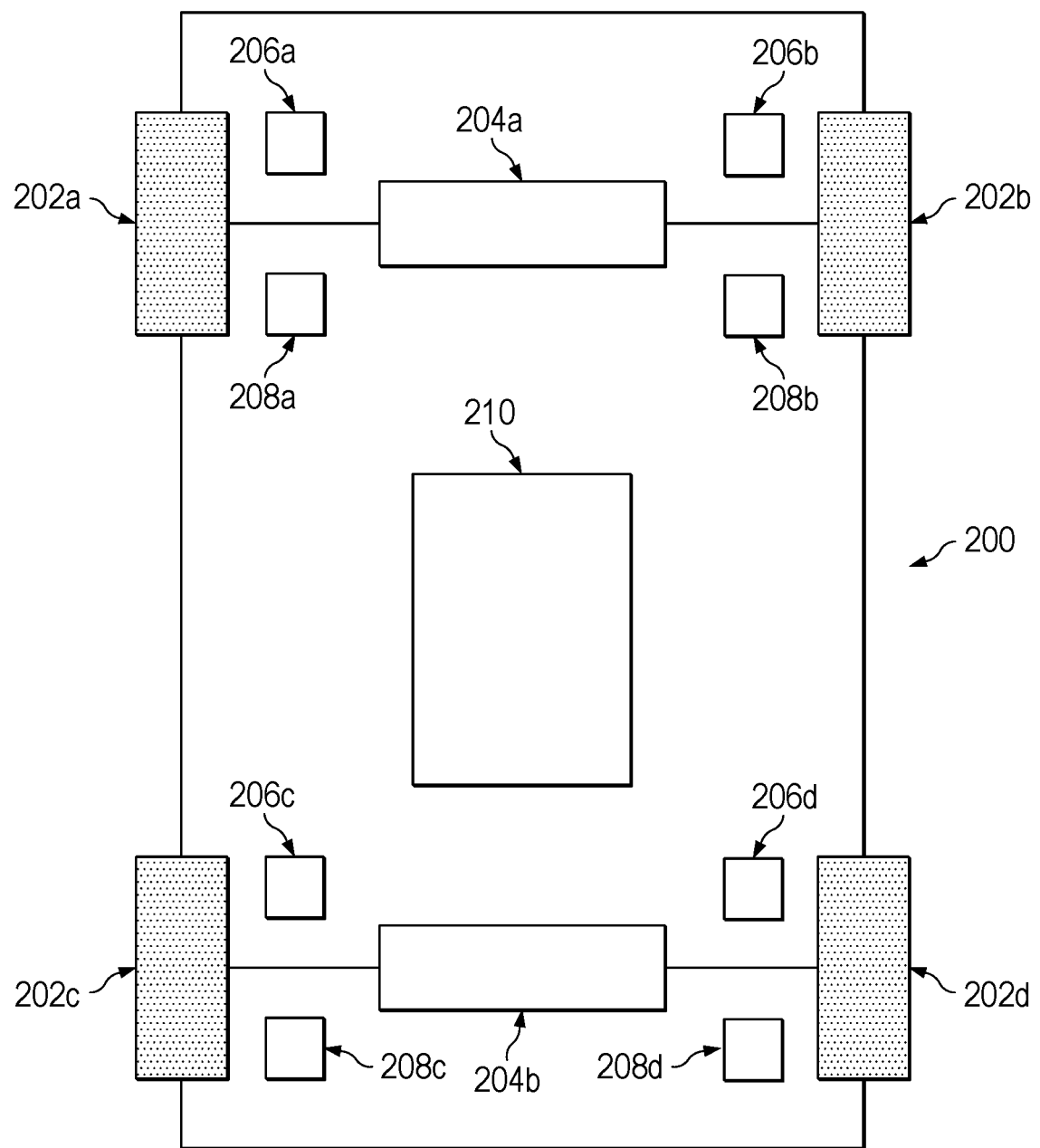
FIGS. 2A and 2B illustrate example arrangements of components in a vehicle supporting autonomous lateral control using direct yaw moment control according to this disclosure.
Figure 2B:
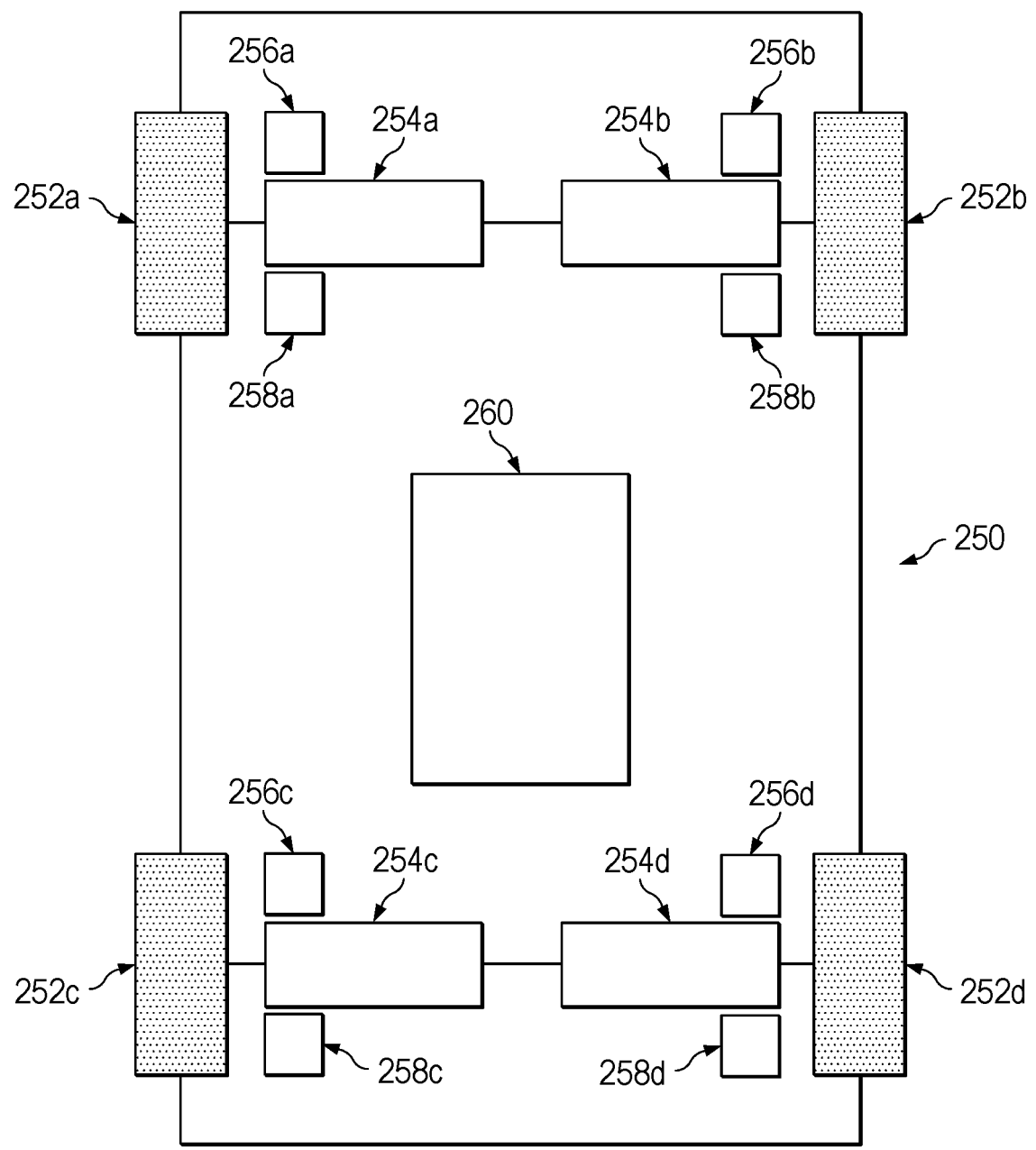

FIGS. 2A and 2B illustrate example arrangements of components in a vehicle 200, 250 supporting autonomous lateral control using direct yaw moment control according to this disclosure. For ease of explanation, the vehicles 200, 250 shown in FIGS. 2A and 2B are described as representing or forming at least a portion of the system 100 shown in FIG. 1. However, the vehicles 200, 250 shown in FIGS. 2A and 2B may be used in or with any other suitable device or system.

As shown in FIG. 2A, the vehicle 200 includes four wheels 202a-202d. Rotation of the wheels 202a-202d is produced using a motor 204a positioned in a front portion of the vehicle 200 and/or a motor 204b positioned in a rear portion of the vehicle 200. Depending on the implementation, the vehicle 200 may include the motor 204a, the motor 204b, or the motors 204a-204b. Each wheel 202a-202d may have an associated braking system 206a-206d, where each braking system 206a-206d can be used to slow the rotation of the associated wheel 202a-202d. In some cases, at least some of the wheels 202a-202d may each have an associated energy regeneration system 208a-208d, which can be used to capture energy from rotation of the associated wheel 202a-202d and use the captured energy to recharge a battery subsystem or other power source 210 of the vehicle 200.

In the vehicle 200, torque vectoring may occur in two ways. First, when at least one motor 204a or 204b is driving rotation of at least one associated pair of wheels 202a-202b or 202c-202d, the braking system 206a, 206b, 206c, 206d of one wheel can be applied to a greater extent, and the braking system 206a, 206b, 206c, 206d of another wheel can be applied to a lesser extent or not at all. For example, the braking system 206a or 206c may be applied more than the braking system 206b or 206d. Second, when at least one motor 204a or 204b is driving rotation of at least one associated pair of wheels 202a-202b or 202c-202d, the energy regeneration system 208a, 208b, 208c, 208d of one wheel can be applied to a greater extent, and the energy regeneration system 208a, 208b, 208c, 208d of another wheel can be applied to a lesser extent or not at all. For instance, the energy regeneration system 208a or 208c may be applied more than the energy regeneration system 208b or 208d. In either case, less torque is applied to the wheel 202a or 202c and more torque is applied to the wheel 202b or 202d. The result is that the vehicle 200 laterally moves to the left due to the presence of more torque along the right side of the vehicle 200. Similar operations may occur to move the vehicle 200 laterally to the right by creating more torque along the left side of the vehicle 200. Note that either or both of braking system control and energy regeneration system control may be used to cause this lateral movement of the vehicle 200.

As shown in FIG. 2B, the vehicle 250 includes four wheels 252a-252d. Each wheel 252a-252d may have an associated braking system 256a-256d, where each braking system 256a-256d can be used to slow the rotation of the associated wheel 252a-252d. In some cases, at least some of the wheels 252a-252d may each have an associated energy regeneration system 258a-258d, which can be used to capture energy from rotation of the associated wheel 252a-252d and use the captured energy to recharge a battery subsystem or other power source 260 of the vehicle 250. In this example, rotation of the wheels 252a-252d is produced using a pair of motors 254a-254b positioned in a front portion of the vehicle 250 and/or a pair of motors 254c-254d positioned in a rear portion of the vehicle 250. Depending on the implementation, the vehicle 250 may include the motors 254a-254b, the motors 254c-254d, or the motors 254a-254d.

In the vehicle 250, torque vectoring may occur in three ways. First, as discussed above, different braking systems 256a, 256b, 256c, 256d may be applied differently in order to create more torque along one side of the vehicle 250 and less torque along the other side of the vehicle 250. Second, as discussed above, different energy regeneration systems 258a, 258b, 258c, 258d may be applied differently in order to create more torque along one side of the vehicle 250 and less torque along the other side of the vehicle 250. Third, the motors 254a, 254b, 254c, 254d may be controlled to produce different amounts of torque on the wheels 252a, 252b, 252c, 252d, which is often referred to as "motor driving" control. For example, the motor 254a or 254c may apply more torque to the wheel 252a or 252c than the motor 254b or 254d applies to the wheel 252b or 252d. The result is that the vehicle 250 laterally moves to the right due to the presence of more torque along the left side of the vehicle 250. Similar operations may occur to move the vehicle 250 laterally to the left by creating more torque along the right side of the vehicle 250. Note that braking system control, energy regeneration system control, and/or motor control may be used individually or in any suitable combination to cause this lateral movement of the vehicle 200.

As described in more detail below, any of these techniques may be used to control the lateral movement of the system 100. For example, the torque vectoring force distribution function 114a may use the desired yaw rate and yaw acceleration from the decision planning function 112 in order to determine the desired yaw moment for the system 100. The torque vectoring force distribution function 114a may then distribute the desired yaw moment for implementation using any of the torque vectoring techniques that are supported in the specific system 100. Ideally, the torque vectoring will cause the system 100 to perform lane centering, lane keeping, lane changing, impact avoidance, or other functions.

Although FIGS. 2A and 2B illustrate examples of arrangements of components in a vehicle 200, 250 supporting autonomous lateral control using direct yaw moment control, various changes may be made to FIGS. 2A and 2B. For example, various components shown in FIG. 2 may be combined, further subdivided, replicated, omitted, or rearranged and additional functions and components may be added according to particular needs. As a particular example, a vehicle may not include one braking system and one energy regeneration system per wheel. In general, a vehicle may include any suitable number of wheels, any suitable number of braking systems, and (optionally) any suitable number of energy regeneration systems.

Figure 3:
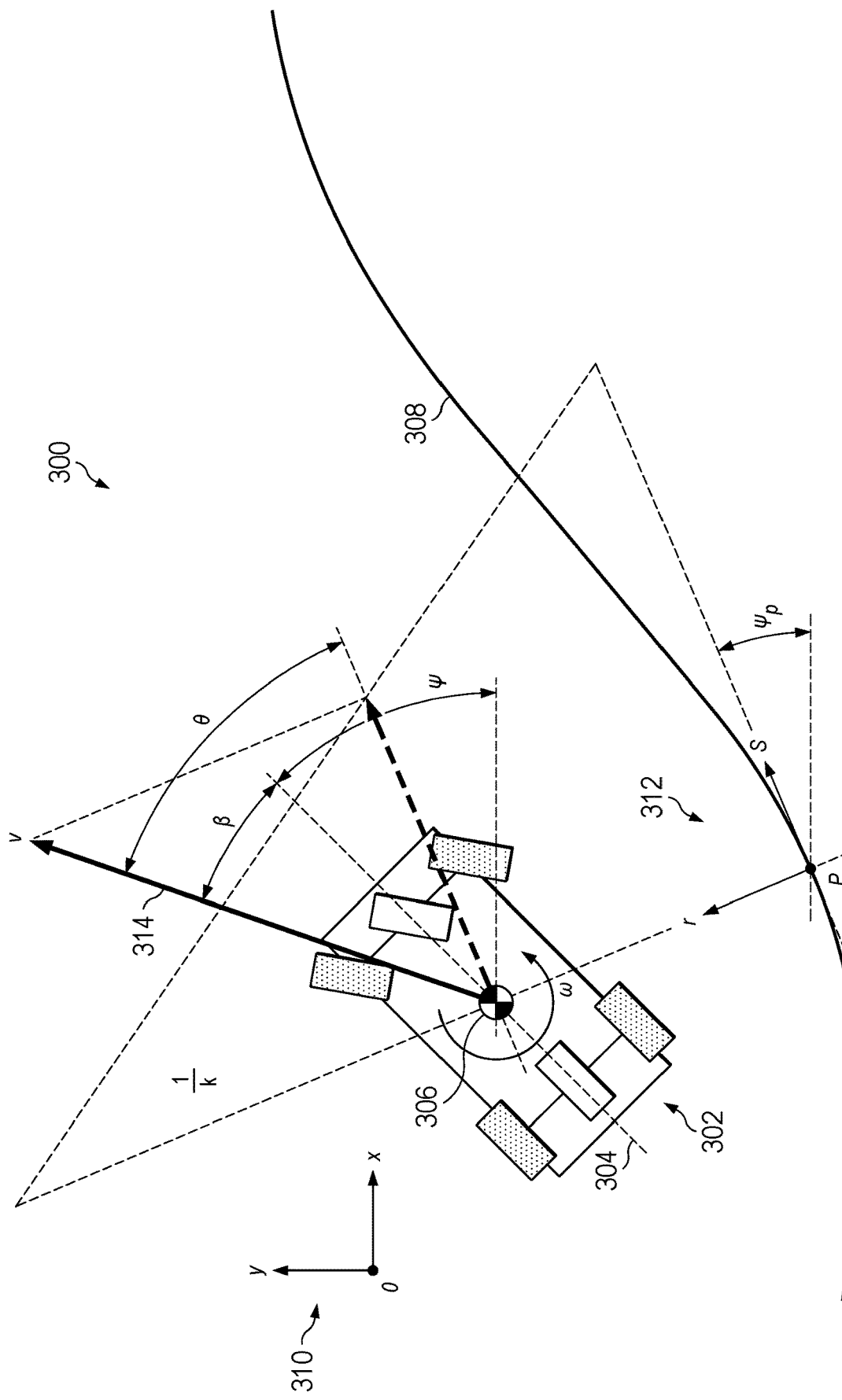
FIG. 3 illustrates an example of autonomous lateral control of a vehicle using direct yaw moment control according to this disclosure.

FIG. 3 illustrates an example of autonomous lateral control 300 of a vehicle 302 using direct yaw moment control according to this disclosure. For ease of explanation, the autonomous lateral control 300 shown in FIG. 3 is described as involving the system 100 shown in FIG. 1, which may include one of the vehicles 200, 250 shown in FIGS. 2A and 2B. However, the autonomous lateral control 300 shown in FIG. 3 may be used in or with any other suitable device or system.

As shown in FIG. 3, a vehicle 302 includes a longitudinal axis 304 and a center point 306. The longitudinal axis 304 extends through a center of the vehicle 302 along the length (as measured front-to-back) of the vehicle 302. The center point 306 represents a center of gravity or pivot point of the vehicle 302 and denotes the point about which yaw can be applied to cause lateral movement (left or right movement) of the vehicle 302. The vehicle 302 is shown as traveling along a predicted or desired path, which is referred to as a reference path 308. In some cases, the reference path 308 may represent the center of a current traffic lane in which the vehicle 302 is traveling, although the reference path 308 may represent any other suitable path of travel for the vehicle 302. Note that while the reference path 308 is shown here as being separated from the vehicle 302 by a certain amount of space, this is done for ease of illustration only. The vehicle 302 may actually be traveling on or along the reference path 308, in which case the vehicle 302 may be controlled so that the center point 306 of the vehicle 302 follows the reference path 308 as closely as possible.

Two coordinate systems are also illustrated in FIG. 3. A Cartesian coordinate system 310 here defines an x-axis and a y-axis, where these two axes are orthogonal to one another. In this example, the x-axis and the y-axis are fixed, which means the axes point in the same direction regardless of the reference path 308 or the direction of travel of the vehicle 302. A vehicle-based coordinate system (such as a Frenet coordinate system) 312 here defines an r-axis and an s-axis, where these two axes are again orthogonal to one another. The s-axis is used to define the vehicle's longitudinal displacement along a road or other reference path 308, and the r-axis is used to define the vehicle's lateral displacement within the road (such as within a lane or within a collection of lanes). The axes of the vehicle-based coordinate system 312 are not fixed and can vary as the reference path 308 curves and turns.

As noted above, the path-tracking control function 112a can operate to identify a desired yaw rate and a desired yaw acceleration to be used to help keep the vehicle 302 on the reference path 308 using (among other things) torque vectoring. In some embodiments, the path-tracking control function 112a can operate as follows.

Full nonlinear kinematics of the vehicle 302 can be based on the vehicle's coordinates within the vehicle-based coordinate system 312. For example, the center point 306 of the vehicle 302 can be projected to a point P on the reference path 308. This defines an angle $\psi_p$ between the s-axis of the vehicle-based coordinate system 312 and the x-axis of the Cartesian coordinate system 310, meaning the angle $\psi_p$ identifies an orientation of the reference path 308 at the projection point P within the Cartesian coordinate system 310. A velocity vector 314 associated with the vehicle 302 defines at least the direction of travel of the vehicle 302 at a particular instance of time. An angle $\psi$ is defined between the x-axis of the Cartesian coordinate system 310 and the longitudinal axis 304 of the vehicle 302, meaning the angle $\psi$ identifies an orientation of the vehicle's longitudinal axis 304 within the Cartesian coordinate system 310. An angle $\beta$ is defined between the longitudinal axis 304 of the vehicle 302 and the velocity vector 314, meaning the angle $\beta$ identifies the side-slip angle of the vehicle 302 (which refers to the angle between the longitudinal axis 304 of the vehicle 302 and the instantaneous direction of travel of the vehicle 302). An angle $\theta$ is defined between the s-axis of the vehicle-based coordinate system 312 and the velocity vector 314, meaning the angle $\theta$ identifies the relative course angle of the vehicle 302 within the vehicle-based coordinate system 312. A value $\kappa$ denotes a measure of the curvature of the reference path 308 at the projection point P.

By projecting a reference point (the center point 306 of the vehicle 302) onto the reference path 308 and by introducing a vehicle-based coordinate frame defined as (P, s, r) at the projection point P, the kinematics of the vehicle 302 may be described relative to the reference path 308. Any suitable projection technique may be used here to project the vehicle's reference point onto the reference path 308. One common projection technique is an orthogonal projection that defines the projection point P such that a connecting line between a point C (the center point 306 of the vehicle 302) and the projection point P is orthogonal to the tangent to the reference path 308 at the projection point P. Another common projection technique is a parallel projection that defines the projection point P by the intersection of the reference path 308 with the y-axis of the vehicle-based coordinate system 312. While the parallel projection may be easier to compute, the orthogonal projection can have certain advantages in some instances. For example, since the orthogonal projection is invariant to vehicle rotation, the projection point P monotonically travels along the reference path 308 over time (as long as the vehicle velocity remains positive). While orthogonal projection is used in the following discussion, parallel projection or any other suitable projection technique may be used here.

These definitions can be used to express the full nonlinear kinematics of the vehicle 302 as follows. The vehicle 302 can be said to travel exactly along the reference path 308 if the reference point P lies on the reference path 308 and the velocity vector 314 of the vehicle 302 is tangent to the reference path 308. The relative course angle $\theta$ of the vehicle 302 can therefore be expressed as $\theta=\beta+\psi-\psi_p$, since $\psi_p$ is the orientation of the reference path 308 at the projection point P. The vehicle kinematics can therefore be expressed as follows.

$$\dot{s} = \frac{v\cos(\theta)}{1-\kappa r} \quad s(0) = s_0 \tag{1}$$

$$\dot{r} = v\sin(\theta) \quad r(0) = r_0 \tag{2}$$

$$\dot{\theta} = \dot{\beta} + \omega - \frac{v\kappa\cos(\theta)}{1-\kappa r} \quad \theta(0) \text{ \& } = \theta_0 \tag{3}$$

The curvature $\kappa$ can be defined as the derivative of the orientation of the vehicle 302 with respect to the traveled distance along the reference path 308 and may be interpreted as the reciprocal of the local curve radius. Equation (1) here describes how fast the vehicle 302 moves along the reference path 308, and it is derived by taking the fraction of the vehicle's velocity tangent to the path 308 (v cos(θ)) and applying the rule of three. Equation (1) plays an important role in deriving the vehicle's dynamics but is usually ignored in lateral motion control. This illustrates one benefit of using Frenet coordinates or other vehicle-based coordinates in lateral control, namely that the number of relevant differential equations can be reduced. Equation (2) here describes how fast the vehicle 302 moves laterally, and Equation (3) here describes how fast the vehicle 302 is changing its relative course angle.

Motion control tasks are often simplified when describing vehicle motion in Frenet coordinates or other vehicle-based coordinates since only the lateral offset r from the s-axis may need to be regulated. To account for nonlinear vehicle kinematics, feedback linearization can be used by the path-tracking control function 112a. Feedback linearization starts by defining a controlled output z and deriving the output with respect to time until a control input u appears in the equation. For moderate curvature changes (such as those that are expected to occur on highways), path dynamics are much slower than vehicle dynamics. Thus, to simplify the design of the path-tracking control function 112a, the vehicle dynamics can be neglected here, and the side-slip angle (the β angle) can be treated as a known time-varying parameter similar to longitudinal velocity. By defining the lateral offset of the vehicle 302 as the controlled output z, the first two derivatives of the controlled output z can be determined as follows.

$$z = r \tag{4}$$

$$\dot{z} = \dot{r} = v\sin(\theta) \tag{5}$$

$$\ddot{z} = v\cos(\theta)\dot{\theta} = v\cos(\theta)\left(\dot{\beta} + \omega - \frac{v\kappa\cos(\theta)}{1-\kappa r}\right) \stackrel{\dot{\beta}=0}{=} v\cos(\theta)\left(\omega - \frac{v\kappa\cos(\theta)}{1-\kappa r}\right) = \eta_1 \tag{6}$$

Equating Equation (6) with a virtual input $\eta_1$ and solving for the yaw rate can yield a feedback linearizing control law as follows.

$$\omega_d = \underbrace{\frac{\eta_1}{v\cos(\theta)}}_{feedback} + \underbrace{\frac{v\kappa\cos(\theta)}{1-\kappa r}}_{feedforward} \tag{7}$$

The first term in Equation (7) can be considered a feedback term based on offsets from the reference path 308, while the second term in Equation (7) can be considered a feedforward term that is dependent on the reference path's curvature. The desired yaw acceleration can be derived from one more additional derivatives of the above as follows.

$$\dddot{z} = v\cos(\theta)(\dot{\omega} - v^2\kappa\cos(\theta) + v\kappa\sin(\theta)(\omega - v\kappa\cos(\theta))) - v\sin(\theta)(\omega - v\kappa\cos(\theta))^2 = \eta_2 \tag{8}$$

where $\dot{\omega}$ denotes the yaw acceleration and k denotes the rate of curvature. By equating Equation (8) with a virtual input $\eta_2$ and solving for $\eta_2$ to find a linearizing control law, the states of the control system can be expressed as follows.

$$\xi = \begin{bmatrix} r \\ v\sin(\theta) \\ v\cos(\theta)(\omega - v\kappa\cos(\theta)) \end{bmatrix} \tag{9}$$

$$\dot{\xi} = \begin{bmatrix} 0 & 1 & 0 \\ 0 & 0 & 1 \\ 0 & 0 & 0 \end{bmatrix} \xi + \begin{Bmatrix} 0 \\ 0 \\ 1 \end{Bmatrix} \eta_2 \tag{10}$$

The desired yaw acceleration can be determined as follows.

$$\dot{\omega}_d = -v\kappa\sin(\theta)(\omega_d - v\kappa\cos(\theta)) + v\kappa\cos(\theta) + \frac{1}{v\cos(\theta)}(\eta_2 + v\sin(\theta)(\omega_d - v\kappa\cos(\theta))^2) \tag{11}$$

Thus, the path-tracking control function 112a may use this approach to identify the desired yaw rate and the desired yaw acceleration for the vehicle 302.

Once the desired yaw rate and the desired yaw acceleration for the vehicle 302 are determined, the torque vectoring force distribution function 114a can determine the desired yaw moment for the vehicle 302 in order to keep the vehicle 302 traveling along the reference path 308. The torque vectoring force distribution function 114a can also identify a distribution of the desired yaw moment into individual wheels of the vehicle 302. In some embodiments, the torque vectoring force distribution function 114a can operate as follows.

For higher speeds and moderate lateral accelerations, the dynamics of the vehicle 302 can be described by a linear single-track model with states associated with the side-slip angle (the β angle) and the yaw rate (denoted ω in FIG. 3). Inputs to the linear single-track model can include front road wheel angle (denoted $\delta_f$) and yaw moment (denoted $M_z$). The dynamics of the vehicle 302 in this model may be formulated with respect to the center of gravity (COG) of the vehicle 302 (the center point 306). In some cases, the dynamics of the vehicle 302 can be defined by a velocity-dependent state-space model as follows.

$$\underbrace{\begin{bmatrix} \dot{\beta} \\ \dot{\omega} \end{bmatrix}}_{\dot{x}} = \underbrace{\begin{bmatrix} -\frac{(C_r + C_f)}{mv} & \frac{(l_r C_r - l_f C_f)}{mv^2} - 1 \\ \frac{(l_r C_r - l_f C_f)}{I_z} & -\frac{(l_r^2 C_r - l_f^2 C_f)}{I_z v} \end{bmatrix}}_{A(v)} \begin{bmatrix} \beta \\ \omega \end{bmatrix} + \underbrace{\begin{bmatrix} \frac{C_f}{mv} \\ \frac{l_f C_f}{I_z} \end{bmatrix}}_{B(v)} \delta_f + \begin{bmatrix} 0 \\ I_z \end{bmatrix} M_z \tag{12}$$

Here, m represents the vehicle's mass, $I_z$ represents the moment of inertia of the vehicle 302 with respect to the vertical axis, $l_f$ and $l_r$ respectively represent distances from the center of gravity to the front and rear axles of the vehicle 302, and $C_f$ and $C_r$ respectively represent the cornering stiffnesses of the front and rear wheels of the vehicle 302. Note that the cornering stiffnesses here refer to single wheels and not to a full axle. To avoid unmeasurable side-slip angle, measurable lateral acceleration can be used and may be expressed as follows.

$$a_y = v \cdot (\dot{\beta} + \omega) \tag{13}$$

Using a wheelbase $L = l_f + l_r$, the yaw dynamics of the vehicle 302 can be concisely expressed as follows.

$$\dot{\omega} = \underbrace{\frac{C_f C_r}{C_f + C_r} \frac{L^2}{I_z v} \omega}_{f_\omega} + \underbrace{\frac{m(l_f C_f - l_r C_r)}{I_z (C_f + C_r)} a_y}_{f_a} + \underbrace{\frac{C_f C_r}{C_f + C_r} \frac{L}{I_z} \delta_f}_{f_\delta} + \frac{1}{I_z} M_z = \quad (14)$$

$$f_\omega \cdot \omega + f_a \cdot a_y + f_\delta \cdot \delta_f + \frac{1}{I_z} M_z$$

By defining the error between the actual yaw rate ($\omega$) and the desired yaw rate ($\omega_d$) as $s \triangleq \omega - \omega_d$, the time derivative of the error and the overall error dynamics can be written with the positive K>0 to make it convergent, which can be expressed as follows.

$$\dot{s} = \dot{\omega} - \dot{\omega}_d \rightarrow \dot{s} = -K \cdot s \quad (15)$$

$$\dot{\omega} - \dot{\omega}_d = -K \cdot (\omega - \omega_d) \quad (16)$$

From the concise form of the yaw dynamics shown above, the yaw moment can be expressed as follows.

$$M_z = I_z [\dot{\omega} - f_\omega \cdot \omega - f_a \cdot a_y - f_\delta \cdot \delta_f] \quad (17)$$

The desired yaw moment for tracking the reference path 308 can therefore be expressed as follows.

$$M_{z,d} = I_z[\dot{\omega} - f_\omega \omega - f_a a_y - f_\delta \delta_f] = I_z[\dot{\omega}_d - K \cdot (\omega - \omega_d) - f_\omega \omega - f_a a_y - f_\delta \delta_f] \quad (18)$$

As can be seen here, the torque vectoring force distribution function 114a can determine the desired yaw moment from the desired yaw rate and the desired yaw acceleration, which are based on the feedback linearization of full nonlinear kinematics and the single-track dynamics.

Once the desired yaw moment to be used to (ideally) keep the vehicle 302 following the reference path 308 is identified, the desired yaw moment is distributed to the various wheels of the vehicle 302 as wheel forces, which are converted into wheel torques via the effective dynamic radii of the wheels. This can be expressed as follows.

$$M_{z,d} = (-F_{left} + F_{right}) \cdot \frac{L_w}{2} \quad (19)$$

Here, $F_{left} = F_{FL} + F_{RL}$ represents the sum of desired tire forces on the left side of the vehicle 302, which is based on a force at the left front wheel, $F_{FL}$, and a force at the left rear wheel, $F_{RL}$. Also, $F_{right} = F_{FR} + F_{RR}$ represents the sum of desired tire forces on the right side of the vehicle 302, which is based on a force at the right front wheel, $F_{FR}$, and a force at the right rear wheel, $F_{RR}$. In addition, $L_w$ represents the length between left and right wheels along the same axle of the vehicle 302. The sum of forces equals the total wheel force, which can be expressed as follows.

$$F_{total} = F_{left} + F_{right} \quad (20)$$

The total force $F_{total}$ can be defined by the maneuver required to be performed by the vehicle 302. In the case of path tracking (with an accelerating, constant-speed, or decelerating vehicle), there can be a corresponding force for each case. With two constraints (moment and force), the forces on the left and right sides of the vehicle 302 can be determined, and the distribution of the forces to the front and rear portions of the vehicle 302 can be identified according to the acceleration from the total force. In some embodiments, this can be expressed as follows.

$$\begin{cases} F_{FL} = \alpha_L \cdot F_{left} \\ F_{RL} = (1 - \alpha_L) \cdot F_{left} \end{cases} \quad (21)$$

$$\begin{cases} F_{FR} = \alpha_L \cdot F_{right} \\ F_{RR} = (1 - \alpha_L) \cdot F_{right} \end{cases} \quad (22)$$

Here, $\alpha_L$ is related to the required longitudinal acceleration, road friction, etc. The desired tire forces can be converted to wheel torques, such as in the following manner.

$$T_{ij} = r_{eff} F_{ij} \quad (23)$$

Here, $r_{eff}$ is the effective dynamic radius of a wheel. In this way, the torque vectoring force distribution function 114a can determine how to distribute the desired yaw moment to the different wheels of the vehicle 302. As described below, the distributed desired yaw moment may be implemented in various ways, such as braking, energy regeneration, and/or motor control.

Although FIG. 3 illustrates one example of autonomous lateral control 300 of a vehicle 302 using direct yaw moment control, various changes may be made to FIG. 3. For example, the vehicle 302 may follow any other suitable reference path, and the angles shown here can vary based on the current location of the vehicle 302 along the reference path.

Figure 4:
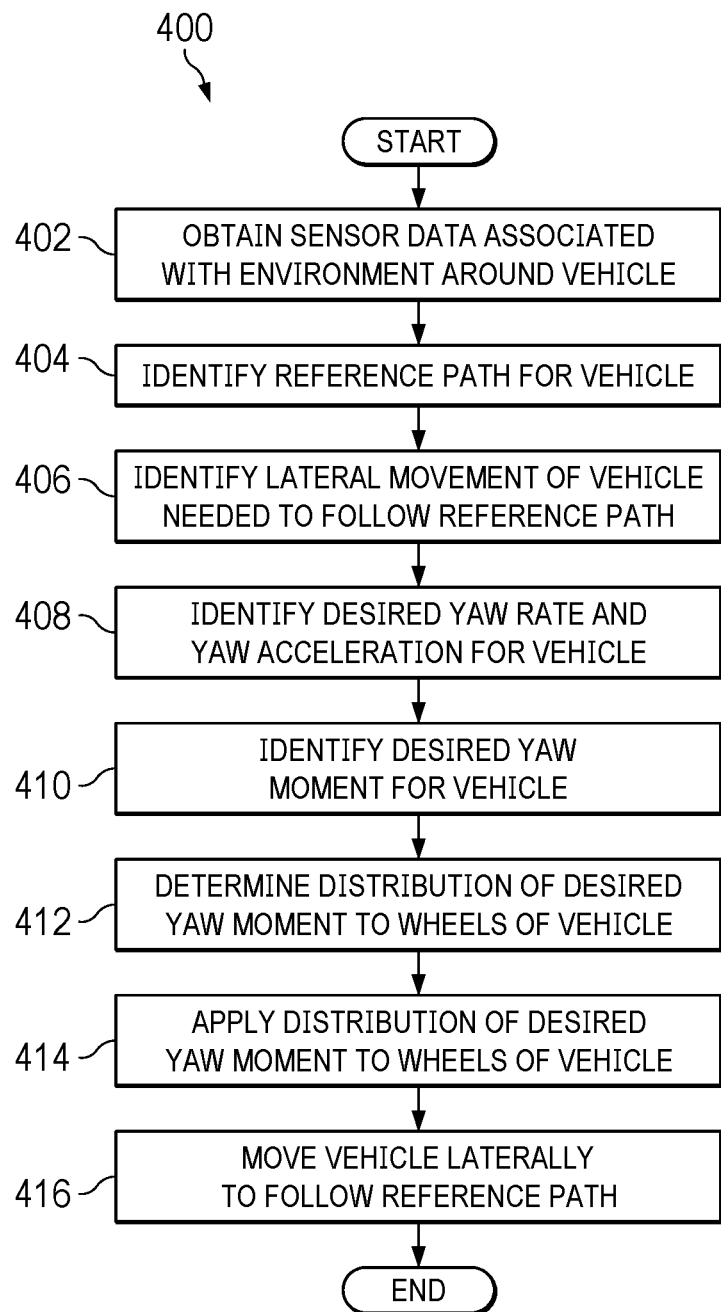
FIG. 4 illustrates an example method for autonomous lateral control of a vehicle using direct yaw moment control according to this disclosure.

FIG. 4 illustrates an example method 400 for autonomous lateral control of a vehicle using direct yaw moment control according to this disclosure. For ease of explanation, the method 400 shown in FIG. 4 is described as being performed by the system 100 shown in FIG. 1, which may include one of the vehicles 200, 250, 302 shown in FIGS. 2A, 2B, and 3. However, the method 400 shown in FIG. 4 may be performed using any other suitable device or system.

As shown in FIG. 4, sensor data associated with an environment around a vehicle is obtained at step 402. This may include, for example, the processor 102 of a vehicle 200, 250, 302 or system 100 obtaining information from one or more sensors 104, such as image data from one or more cameras 104a. A reference path for the vehicle is identified at step 404. This may include, for example, the processor 102 identifying other vehicles, objects, lane-marking lines, and other features around the vehicle 200, 250, 302 or system 100. This may also include the processor 102 predicting a behavior of the vehicle 200, 250, 302 or system 100 based on lane-marking lines and the predicted behaviors of other vehicles or objects around the vehicle 200, 250, 302 or system 100. This may further include the processor 102 selecting a desired reference path 308 to be followed, such as by identifying a polynomial representing a center of the traffic lane in which the vehicle 200, 250, 302 or system 100 is traveling. A lateral movement of the vehicle that is needed to follow the reference path is identified at step 406. This may include, for example, the processor 102 identifying a difference between a current location of a reference point of the vehicle 200, 250, 302 or system 100 (such as its center point 306) and the desired reference path 308.

A desired yaw rate and a desired yaw acceleration for the vehicle are determined at step 408. This may include, for example, the processor 102 determining the desired yaw rate based on the lateral offset of the vehicle 200, 250, 302 or system 100 from the reference path 308 and the heading offset of the vehicle 200, 250, 302 or system 100 from the reference path 308. In some embodiments, this determination can be based on full nonlinear kinematics of the vehicle 200, 250, 302 or system 100. This may also include the processor 102 determining the desired yaw acceleration for the vehicle 200, 250, 302 or system 100 based on the full nonlinear kinematics of the vehicle 200, 250, 302 or system 100 and a rate of curvature. As a particular example, this may include the processor 102 determining the desired yaw rate and the desired yaw acceleration as shown above in Equations (1)-(11) above. A desired yaw moment for the vehicle is determined at step 410. This may include, for example, the processor 102 determining the desired yaw moment based on a dynamic model, the desired yaw rate, and the desired yaw acceleration. In some embodiments, the dynamic model may represent a linear single-track model. As a particular example, this may include the processor 102 determining the desired yaw moment as shown above in Equations (12)-(18) above.

A distribution of the desired yaw moment to the wheels of the vehicle is identified at step 412 and applied at step 414. This may include, for example, the processor 102 determining how to distribute the desired yaw moment to the various wheels 202a-202d, 252a-252d of the vehicle 200, 250, 302 or system 100 as wheel forces, which are then converted into wheel torques. As a particular example, this may include the processor 102 determining the distribution of the desired yaw moment as shown above in Equations (19)-(23) above. The vehicle is moved laterally to follow the reference path based on the distributed yaw moment at step 416. This may include, for example, the vehicle 200, 250, 302 or system 100 moving laterally to the left or right based on which side of the vehicle 200, 250, 302 or system 100 has wheels providing more torque and which side of the vehicle 200, 250, 302 or system 100 has wheels providing less torque.

Although FIG. 4 illustrates one example of a method 400 for autonomous lateral control of a vehicle using direct yaw moment control, various changes may be made to FIG. 4. For example, while shown as a series of steps, various steps in FIG. 4 may overlap, occur in parallel, occur in a different order, or occur any number of times. As a particular example, the steps of FIG. 4 may be repeatedly performed in an overlapping manner so that a current lateral movement of the vehicle can be determined and implemented while additional sensor data is being received and processed to determine a future lateral movement of the vehicle.

Figure 5:
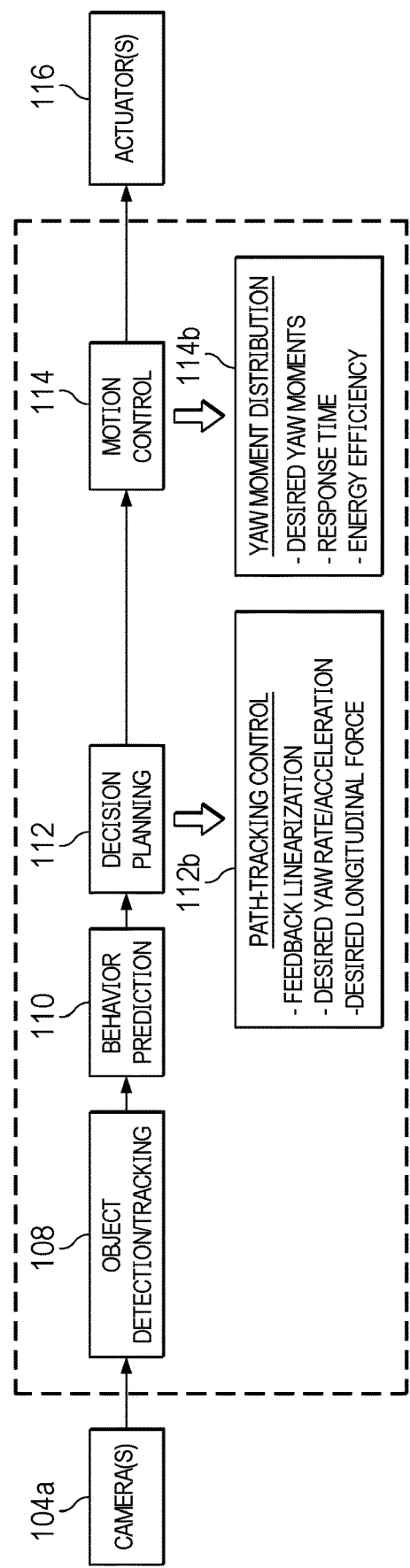
FIG. 5 illustrates an example system supporting path tracking control for self-driving with yaw moment distribution according to this disclosure.
Figure 5:
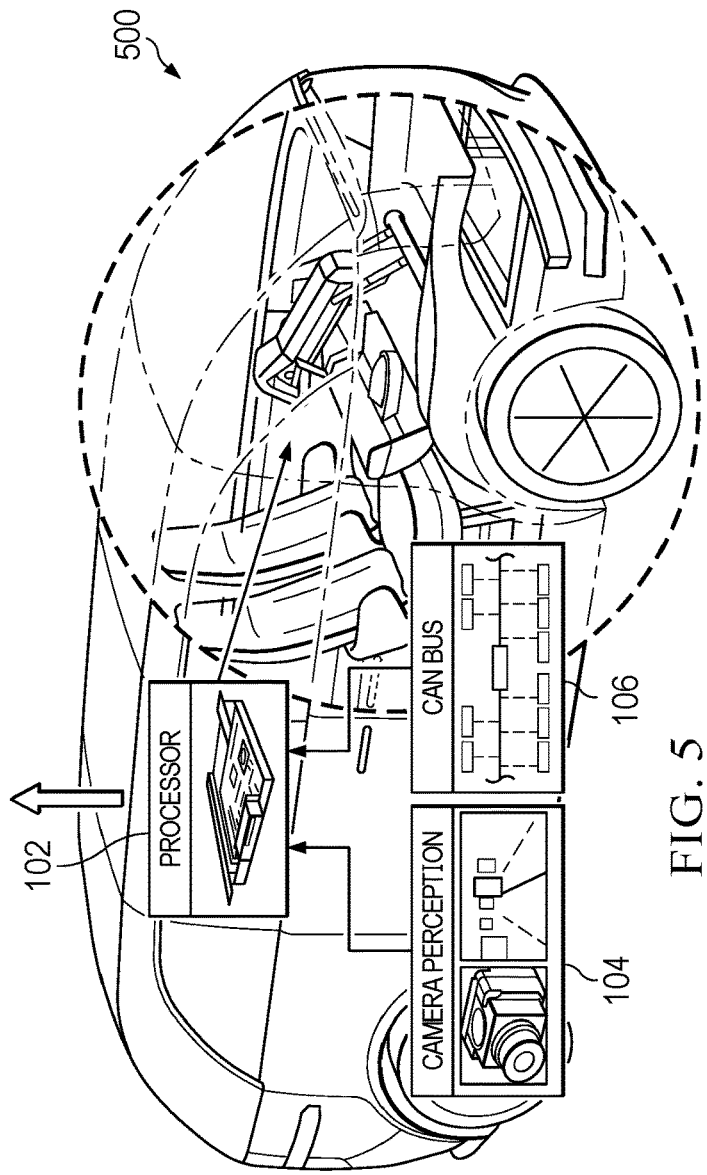

FIG. 5 illustrates an example system 500 supporting path tracking control for self-driving with yaw moment distribution according to this disclosure. The system 500 here includes many of the same components described above with respect to the system 100 of FIG. 1. As a result, common reference numbers are used in the systems 100 and 500 of FIGS. 1 and 5 to refer to corresponding components in the systems 100 and 500.

As shown in FIG. 5, the processor 102 of FIG. 5 performs the decision planning function 112, which here includes a path-tracking control function 112b. The path-tracking control function 112b is similar to the path-tracking control function 112a in FIG. 1 in that the path-tracking control function 112b can be used to identify a desired yaw rate and a desired yaw acceleration for the system 500. In addition, the path-tracking control function 112b in FIG. 5 can be used to determine a desired total longitudinal force to be applied to the system 500 during path control. The total longitudinal force actually applied to the system 500 represents the sum of all forces applied to the system 500 in the longitudinal direction during path control, which may be calculated as the forward force(s) applied by one or more motors minus any backward force(s) applied by one or more braking systems, energy regeneration systems, or other systems. In some embodiments, the desired total longitudinal force can be determined based on a desired speed of the system 500 during travel. For example, the decision planning function 112 can determine whether the system 500 should accelerate, decelerate, or maintain the same speed when traveling over the reference path 308. Among other things, this determination can be based on whether the processor 102 decides to maintain a current travel speed, avoid a potential collision with another vehicle, or change the system's speed based on an upcoming speed limit change. In general, the processor 102 may use any suitable technique to identify a desired total longitudinal force to be applied to the system 500 during travel.

The processor 102 of FIG. 5 also performs the one or more control functions 114, which here includes a yaw moment distribution function 114b. The yaw moment distribution function 114b includes functionality that is the same as or similar to the functionality of the torque vectoring force distribution function 114a. That is, the yaw moment distribution function 114b can identify a desired yaw moment to be applied to the system 500 and (if torque vectoring is used) distribute the desired yaw moment to different wheels of the system 500 in order to implement the torque vectoring. However, since path control may be implemented in various ways, including steering control and different types of torque vectoring control, the yaw moment distribution function 114b can also determine a desired mechanism or mechanisms for implementing the path control, which may or may not involve torque vectoring at any given time. In this example, the yaw moment distribution function 114b can use a desired response time and an energy efficiency when determining how to implement the path control. The desired response time refers to the time in which a path change can occur, and some functions (such as lane centering, lane keeping, and lane changing) may generally have longer response times than other functions (such as evasive steering). The energy efficiency refers to the fact that some torque vectoring techniques (such as energy regeneration) are more effective in terms of preserving energy or reducing energy usage than other torque vectoring techniques (such as braking).

In some embodiments, the yaw moment distribution function 114b may operate as follows. A desired yaw moment for the system 500 can be determined, such as in the manner described above. The yaw moment distribution function 114b may then have the option of implementing the desired yaw moment using steering control only, using torque vectoring only, or using a combination of steering control and torque vectoring. The steering control may be used to control the angle of a steering wheel in the system 500, which controls the orientation of wheels of the system 500. The torque vectoring may be used to control differential torques applied by different wheels of the system 500. In some cases, the distribution of the desired yaw moment $M_{z,d}$ can be expressed as follows.

$$M_{z,d} = \alpha \cdot M_{z,steer} + (1-\alpha) \cdot M_{z,TV} \quad (24)$$

Here, $M_{z,steer}$ represents the amount of yaw moment that is distributed to steering control and $M_{z,TV}$ represents the amount of yaw moment that is distributed to torque vectoring. Also, $\alpha$ represents a weight, which in this example can have a value between zero and one (inclusive). Note that steering control can achieve a desired yaw moment more quickly than torque vectoring, while torque vectoring can often be used to provide for smooth path tracking changes. In particular embodiments, the following can be used to define the value of the weight $\alpha$, where PTC refers to path-tracking control.

$$\begin{cases} \alpha = 0 : \text{Smooth } PTC \\ 0 < \alpha \le 1 : \text{Emergency } PTC \end{cases} \quad (25)$$

During path-tracking operations related to functions such as lane centering, lane keeping, or lane changing, the weight α may be set to zero. These functions also typically allow for considerations of different torque vectoring techniques that have different energy efficiencies. The weight α may be set to a value above zero during emergency operations, such as those involving evasive steering, since steering control can provide a faster response time than torque vectoring. In this way, the weight α identifies an extent to which torque vectoring control is used to implement the desired yaw moment and an extent to which steering control is used to implement the desired yaw moment.

Figure 6:
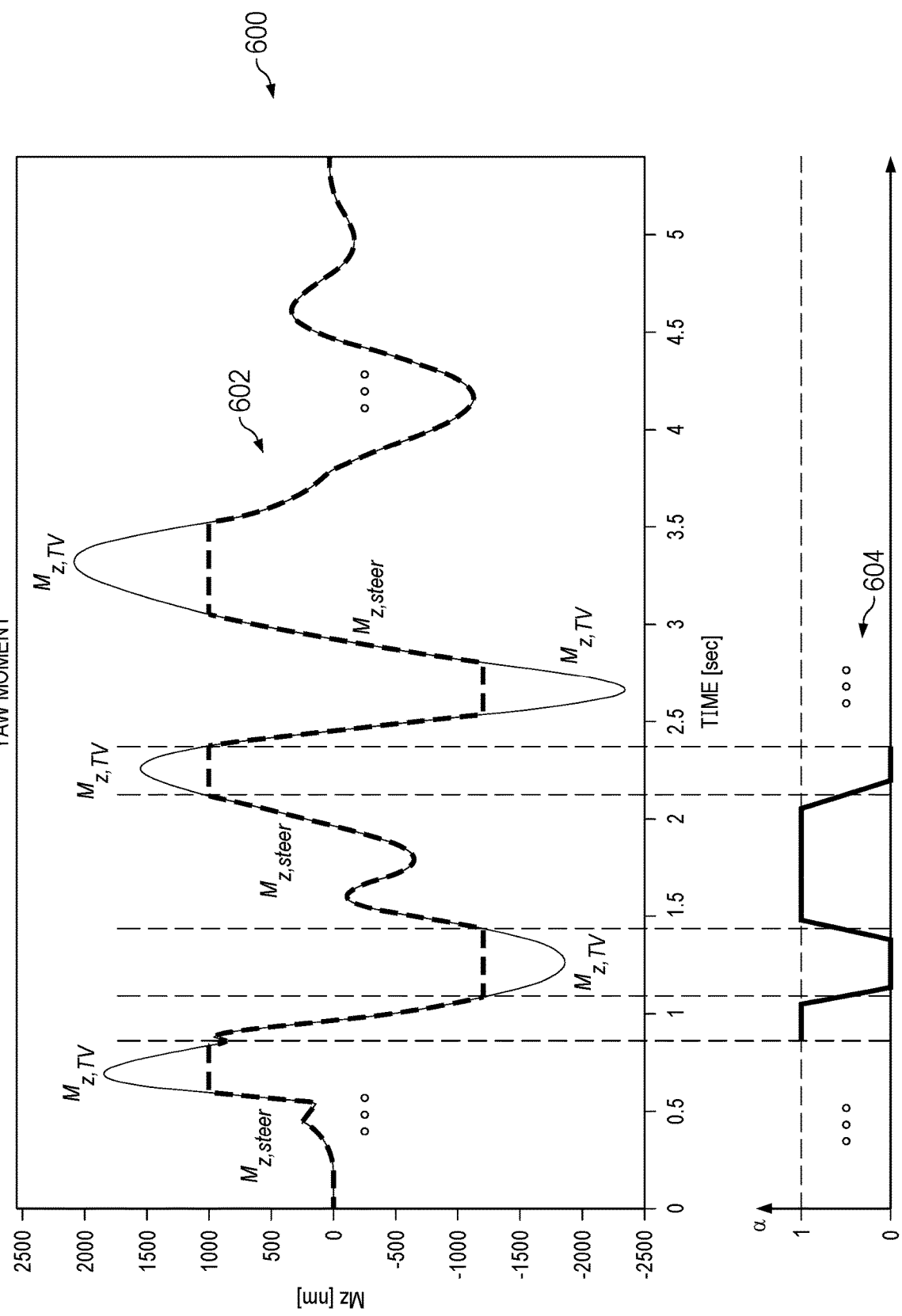
FIG. 6 illustrates an example allocation of a desired yaw moment during path tracking control for self-driving according to this disclosure.

One example of this type of yaw moment allocation technique is shown in FIG. 6, which illustrates an example allocation 600 of a desired yaw moment during path tracking control for self-driving according to this disclosure. The example allocation 600 shown in FIG. 6 is defined according to plots 602 and 604. The plot 602 identifies the distribution of the desired yaw moment between steering control and torque vectoring control over time, and the plot 604 identifies the value of the weight α over time. As can be seen in FIG. 6, the weight α can vary over time based on whether smooth or rapid yaw moment changes are needed in order to control the lateral position of the system 500. The torque vectoring control tends to be smoother, while the steering control can be more rapid or abrupt. The transitions between the two control modes (the two extreme values of the weight α) can be controlled in any suitable manner, such as by using smooth or abrupt changes in the weight α.

Note that the amount of desired yaw moment can still vary even when the weight α has a constant value. For example, when the weight α equals zero, the system 500 may perform lane centering, lane keeping, or lane changing operations. Often times, the desired yaw moments for lane keeping may be less than or equal to the desired yaw moments for lane centering, and the desired yaw moments for lane centering may be less than or equal to the desired yaw moments for lane changing (although this is a generalization and is not necessarily required). Any of these operations may occur using only torque vectoring when the weight α equals zero.

As described above, torque vectoring may be performed in various ways using braking control, energy regeneration control, and motor driving control. In some cases, torque vectoring performed via energy regeneration (also called regenerative braking) control may be used during lane centering and lane keeping, while torque vectoring performed via braking control or motor driving control may be used during lane changing. Note, however, that this is for illustration only and that these or other functions may be implemented using any suitable torque vectoring techniques. Different individual torque vectoring techniques and different combinations of torque vectoring techniques may also be used depending on the circumstances. For instance, torque vectoring by energy regeneration control (denoted "TVbR") may be energy efficient and may be used to decrease overall vehicle speed. Torque vectoring by braking control (denoted "TVbB") may be used to decrease overall vehicle speed but may not be as energy efficient as torque vectoring by energy regeneration control. Torque vectoring by energy regeneration or braking control with motor driving control (denoted "TVbR, TVbD" or "TVbB, TVbD") may be used to increase or maintain overall vehicle speed, and torque vectoring by motor driving control (denoted "TVbD") may be used to increase or maintain the overall vehicle speed. Thus, energy regeneration control, braking control, and motor driving control (either individually or in a suitable combination) may be used to both (i) control the total longitudinal force applied to the system 500 during travel and (ii) control the distribution of the desired yaw moment during travel.

The yaw moment distribution function 114b can use this type of information in determining whether to allocate a desired yaw moment to steering control or torque vectoring control. If torque vectoring control is used, the yaw moment distribution function 114b can use this type of information to allocate the desired yaw moment to one or more specific torque vectoring actuations. One example of this is shown in FIG. 7, which illustrates an example identification of an allocation for a desired yaw moment based on different torque vectoring approaches during path tracking control for self-driving according to this disclosure.

Figure 7:
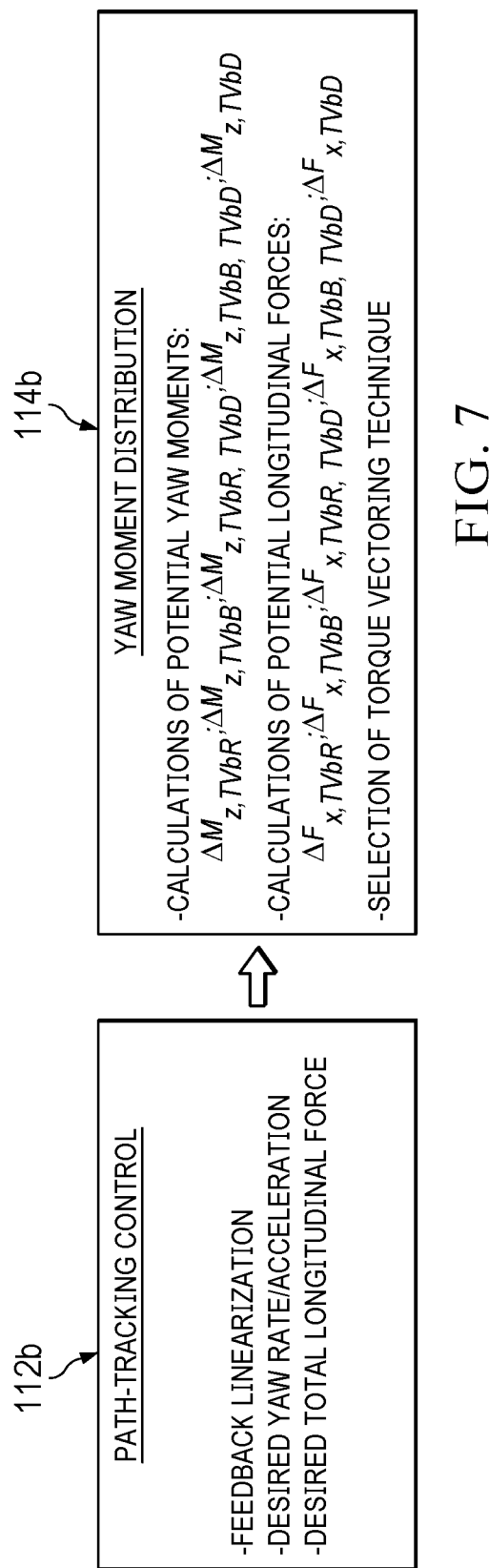
FIG. 7 illustrates an example identification of an allocation for a desired yaw moment based on different torque vectoring approaches during path tracking control for self-driving according to this disclosure.

As shown in FIG. 7, the yaw moment distribution function 114b can be used to determine which torque vectoring technique or techniques to select for use. This is accomplished by calculating potential changes to the yaw moment that are achievable using different torque vectoring technique(s) and potential changes to the total longitudinal force that are achievable using the different torque vectoring technique(s). For example, the processor 102 may calculate the potential change to the yaw moment achievable using energy regeneration control only ($\Delta M_{z,TVbR}$), the potential change to the yaw moment achievable using braking control only ($\Delta M_{z,TVbB}$), the potential change to the yaw moment achievable using energy regeneration control and motor driving control ($\Delta M_{z,TVbR, TVbD}$), the potential change to the yaw moment achievable using braking control and motor driving control ($\Delta M_{z,TVbB, TVbD}$), and the potential change to the yaw moment achievable using motor driving control only ($\Delta M_{z,TVbD}$). Similarly, the processor 102 may calculate the potential change to the total longitudinal force achievable using energy regeneration control only ($\Delta F_{x,TVbR}$), the potential change to the total longitudinal force achievable using braking control only ($\Delta F_{x,TVbB}$), the potential change to the total longitudinal force achievable using energy regeneration control and motor driving control ($\Delta F_{x,TVbR, TVbD}$), the potential change to the total longitudinal force achievable using braking control and motor driving control ($\Delta F_{x,TVbB, TVbD}$), and the potential change to the total longitudinal force achievable using motor driving control only ($\Delta F_{x,TVbD}$). Based on these calculations, the processor 102 can select one or more torque vectoring techniques that can provide a desired yaw moment and that can provide a desired total longitudinal force.

Figure 8:
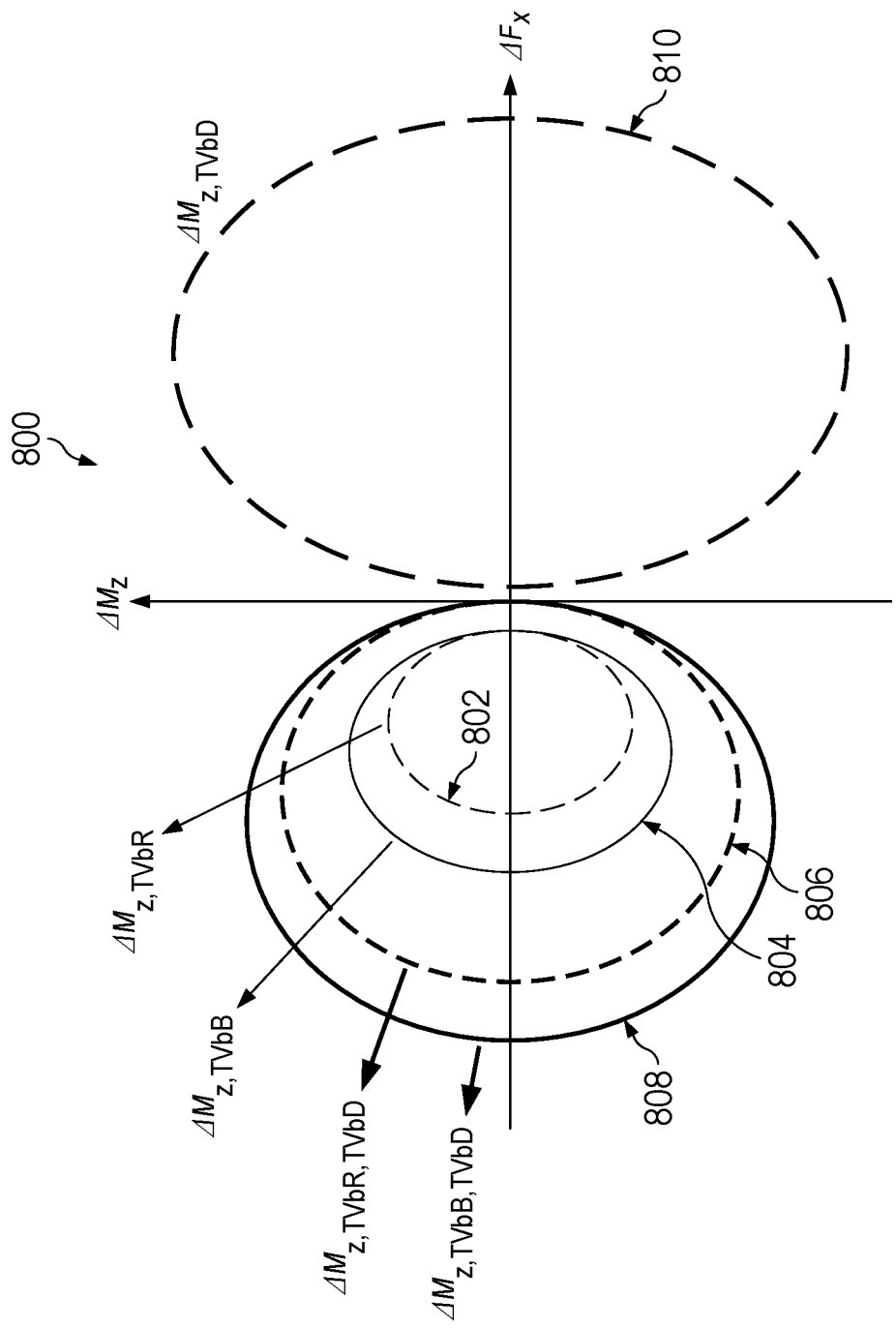
FIG. 8 illustrates example potentials of force and yaw moments from different torque vectoring approaches during path tracking control for self-driving according to this disclosure.

One example of the type of results that may be obtained from these calculations is shown in FIG. 8, which illustrates example potentials of force and yaw moments from different torque vectoring approaches during path tracking control for self-driving according to this disclosure. As shown in FIG. 8, a graph 800 plots the potential changes to the total longitudinal force of the system 500 along the horizontal axis and potential changes to the yaw moment of the system 500 along the vertical axis. In the graph 800, a plot 802 represents the potential changes to the total longitudinal force and yaw moment achievable using energy regeneration control only, and a plot 804 represents the potential changes to the total longitudinal force and yaw moment achievable using braking control only. Also, a plot 806 represents the potential changes to the total longitudinal force and yaw moment achievable using energy regeneration control and motor driving control, and a plot 808 represents the potential changes to the total longitudinal force and yaw moment achievable using braking control and motor driving control. In addition, a plot 810 represents the potential changes to the total longitudinal force and yaw moment achievable using motor driving control only.

The processor 102 can identify the desired yaw moment and the desired total longitudinal force for the system 500 as described above. The processor 102 can use the desired yaw moment and the desired total longitudinal force with the plots 802-810 shown in FIG. 8 to identify which torque vectoring technique or techniques might be used to achieve the desired yaw moment and the desired total longitudinal force. For example, to increase the current total longitudinal force on the system 500 in order to create a larger desired total longitudinal force on the system 500, the processor 102 may select motor driving control only to perform torque vectoring (since this is the only option in FIG. 8 that achieves a positive total longitudinal force change in this example). As a result, the processor 102 may control the driving of multiple motors, such as two or more of the motors 254a-254d, in order to perform torque vectoring in support of path tracking.

To decrease the current total longitudinal force on the system 500 in order to create a smaller desired total longitudinal force on the system 500, the processor 102 may select energy regeneration control only, braking control only, energy regeneration control and motor driving control, or braking control and motor driving control. In some cases, the specific technique(s) selected here for use in torque vectoring may be based on the amount of decrease needed in the total longitudinal force. Smaller decreases in the total longitudinal force on the system 500 may be obtained using energy regeneration control only or braking control only, while larger decreases in the total longitudinal force on the system 500 may be obtained using energy regeneration control and motor driving control or braking control and motor driving control. Also or alternatively, in some cases, the specific technique(s) selected here for use in torque vectoring may be based on the amount of yaw moment changes needed. Smaller yaw moment changes may be obtained using energy regeneration control only or braking control only, while larger yaw moment changes may be obtained using energy regeneration control and motor driving control or braking control and motor driving control. Any desired or necessary changes in the yaw moments and any desired or necessary changes in the total longitudinal force to be implemented by the system 500 may be used by the processor 102 to select the appropriate torque vectoring technique(s) to be used to provide the yaw moment changes and the total longitudinal force changes.

To apply only steering control during path tracking, the weight $\alpha$ can be set to a value of one, which causes the desired yaw moment $M_{z,d}$ to be totally allocated to $M_{z,steer}$ as shown in Equation (24). This may be necessary or desirable, for example, when a faster response is needed for path tracking. Direct or smooth transitions between allocations of the desired yaw moments $M_{z,d}$ to $M_{z,steer}$ and $M_{z,TV}$ can be performed as the weight $\alpha$ is switched between zero and one. Direct transitions involve changing the weight $\alpha$ from a value of zero to a value of one directly (or vice versa), while indirect transitions involve changing the weight $\alpha$ from a value of zero to a value of one (or vice versa) through one or more intermediate values between zero and one. In some cases, the weight $\alpha$ can switch between modes based on the following conditions associated with the desired yaw moment $M_{z,d}$.

$$\alpha = \begin{cases} 1 : M_{z,Lth} < M_{z,d} < M_{z,Uth} \\ 0 : M_{z,d} \leq M_{z,Lth} \text{ or } M_{z,d} \geq M_{z,Uth} \end{cases} \quad (26)$$

Here, $M_{z,Lth}$ and $M_{z,Uth}$ represent lower and upper yaw moment thresholds, respectively. In other cases, the weight $\alpha$ can be transitioned between zero and one via a smooth transition function or other type of transition.

Although FIG. 5 illustrates one example of a system 500 supporting path tracking control for self-driving with yaw moment distribution, various changes may be made to FIG. 5. For example, various functions and components shown in FIG. 5 may be combined, further subdivided, replicated, omitted, or rearranged and additional functions and components may be added according to particular needs. Also, the functionality for path tracking control may be used in any other suitable system, and the system may or may not relate to automotive vehicles or other vehicles.

Although FIG. 6 illustrates one example of an allocation of a desired yaw moment, FIG. 7 illustrates one example of an identification of an allocation for a desired yaw moment based on different torque vectoring approaches, and FIG. 8 illustrates examples of potentials of force and yaw moments from different torque vectoring approaches during path tracking control for self-driving, various changes may be made to FIGS. 6 through 8. For instance, the weight $\alpha$ can be modified in any other suitable manner and is not limited to the specific use shown in FIG. 6. Also, the yaw moment distribution function 114b can be used to calculate potential yaw moment changes and potential total longitudinal force changes for any other suitable torque vectoring technique(s) or for any other suitable combination(s) of torque vectoring techniques. In addition, the results shown in FIG. 8 relate to possible implementations of different torque vectoring techniques, and the same or different torque vectoring techniques may produce different results depending on their implementations.

Figure 9:
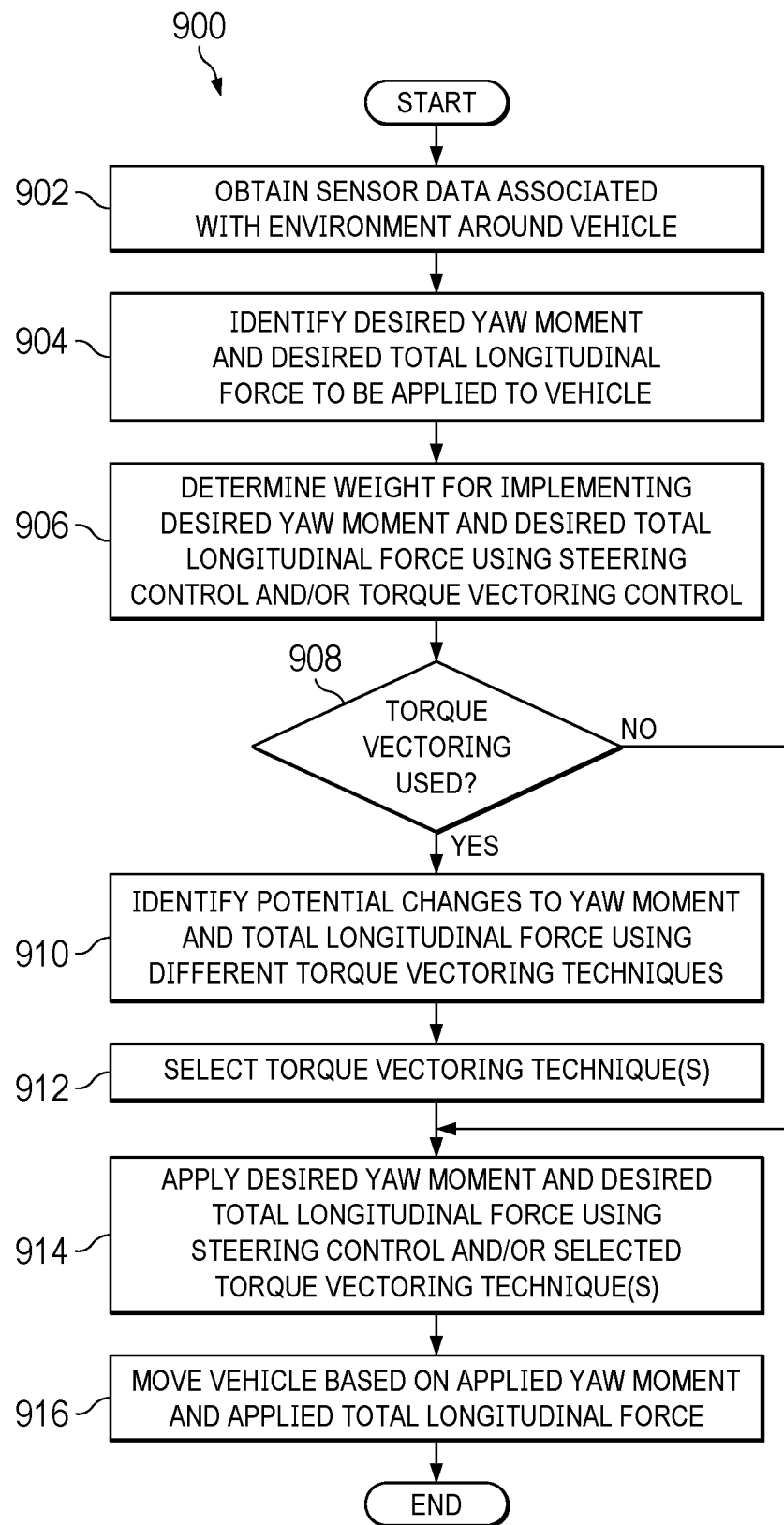
FIG. 9 illustrates an example method for path tracking control for self-driving with yaw moment distribution according to this disclosure.

FIG. 9 illustrates an example method 900 for path tracking control for self-driving with yaw moment distribution according to this disclosure. For ease of explanation, the method 900 shown in FIG. 9 is described as being performed by the system 500 shown in FIG. 5, which may include one of the vehicles 200, 250, 302 shown in FIGS. 2A, 2B, and 3. However, the method 900 shown in FIG. 9 may be performed using any other suitable device or system.

As shown in FIG. 9, sensor data associated with an environment around a vehicle is obtained at step 902. This may include, for example, the processor 102 of a vehicle 200, 250, 302 or system 500 obtaining information from one or more sensors 104, such as image data from one or more cameras 104a. A desired yaw moment and a desired total longitudinal force to be applied to the vehicle is identified at step 904. This may include, for example, the processor 102 using the approaches described above to identify the desired yaw moment, identify the desired yaw acceleration, and identify the desired yaw moment based on the desired yaw moment and the desired yaw acceleration. This can be based on a desired reference path 308 to be followed by the vehicle 200, 250, 302. This may also include the processor 102 determining a desired speed of the vehicle 200, 250, 302 and using the desired speed to estimate the desired total longitudinal force to be applied to the vehicle 200, 250, 302. Note, however, that the processor 102 may use any other suitable technique to identify the desired yaw moment to be applied to the vehicle 200, 250, 302 and/or to identify the desired total longitudinal force to be applied to the vehicle 200, 250, 302.

A weight for implementing the desired yaw moment and the desired total longitudinal force is determined, where the weight identifies the amount of the desired yaw moment to be allocated to steering control and the amount of the desired yaw moment to be allocated to torque vectoring control, at step 906. This may include, for example, the processor 102 determining the weight $\alpha$ using the response times of the steering control and torque vectoring control techniques and the energy efficiencies of the steering control and torque vectoring control techniques. As noted above, for instance, evasive steering or other emergency maneuvers may require shorter response times, in which case the weight $\alpha$ can be set to allocate more or all of the yaw moment to steering control. Lane centering, lane keeping, and lane changing may allow for longer response times, in which case the weight $\alpha$ can be set to allocate more or all of the yaw moment to torque vectoring control.

A determination is made whether torque vectoring will be used based on the weight at step 908. If not, the process can skip to step 914. Otherwise, potential yaw moment changes and potential total longitudinal force changes for different torque vectoring techniques are identified at step 910. This may include, for example, the processor 102 retrieving or calculating the potential yaw moment changes and the potential total longitudinal force changes achievable using different individual torque vectoring techniques and different combinations of torque vectoring techniques. One or more of the torque vectoring techniques are selected based on the potential yaw moment changes and the potential total longitudinal force changes at step 912. This may include, for example, the processor 102 using the information about the different torque vectoring techniques to identify one or more torque vectoring techniques that can provide the desired yaw moment and the desired total longitudinal force. If multiple torque vectoring techniques are identified, this may also include the processor 102 selecting the torque vectoring technique or a combination of torque vectoring techniques that provides the best energy efficiency.

The desired yaw moment and the desired total longitudinal force are applied to the vehicle using steering control and/or one or more selected torque vectoring techniques at step 914. This may include, for example, the processor 102 performing steering control only if the weight $\alpha$ is set to a value of one and performing torque vectoring control only if the weight $\alpha$ is set to a value of zero. The application of the desired yaw moment and the desired total longitudinal force causes movement of the vehicle at step 916. This may include, for example, the vehicle 200, 250, 302 or system 500 moving laterally based on the applied yaw moment and longitudinally based on the applied total longitudinal force.

Although FIG. 9 illustrates one example of a method 900 for path tracking control for self-driving with yaw moment distribution, various changes may be made to FIG. 9. For example, while shown as a series of steps, various steps in FIG. 9 may overlap, occur in parallel, occur in a different order, or occur any number of times. As a particular example, the steps of FIG. 9 may be repeatedly performed in an overlapping manner so that current yaw moment and longitudinal force changes can be determined and implemented while additional sensor data is being received and processed to determine future yaw moment and longitudinal force changes.

Note that many functional aspects of the various embodiments described above can be implemented using any suitable hardware or any suitable combination of hardware and software/firmware instructions. In some embodiments, at least some functional aspects of the various embodiments described above can be embodied as software instructions that are executed by one or more unitary or multi-core central processing units or other processing device(s). In other embodiments, at least some functional aspects of the various embodiments described above can be embodied using one or more application specific integrated circuits (ASICs). When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 10:
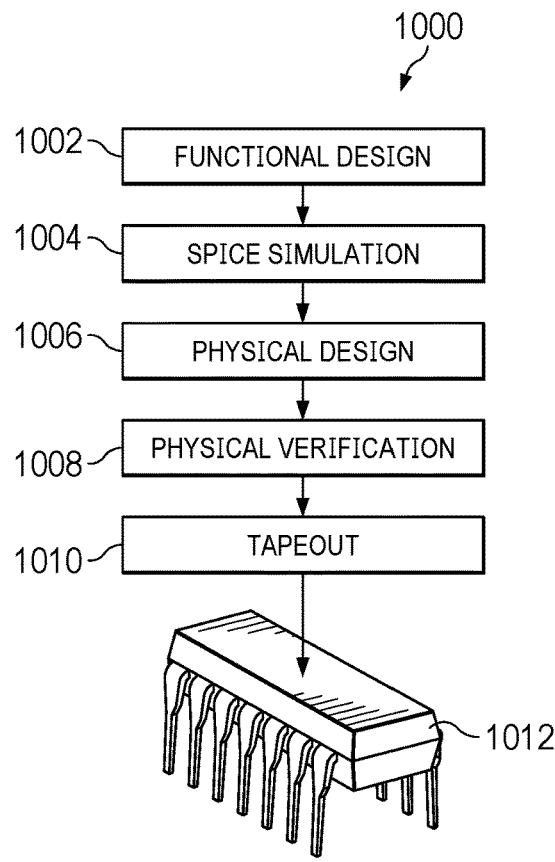
FIG. 10 illustrates an example design flow for employing one or more tools to design hardware that implements one or more vehicle control functions according to this disclosure.

FIG. 10 illustrates an example design flow 1000 for employing one or more tools to design hardware that implements one or more vehicle control functions according to this disclosure. More specifically, the design flow 1000 here represents a simplified ASIC design flow employing one or more EDA tools or other tools for designing and facilitating fabrication of ASICs that implement at least some functional aspects of the various embodiments described above.

As shown in FIG. 10, a functional design of an ASIC is created at step 1002. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 1004. This may include, for example, using the SPICE simulations or other simulations to verify that the functional design of the ASIC performs as expected.

A physical design of the ASIC is created based on the validated data structures and other aspects of the functional design at step 1006. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 1008. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 1010. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 1012.

Although FIG. 10 illustrates one example of a design flow 1000 for employing one or more tools to design hardware that implements one or more vehicle control functions, various changes may be made to FIG. 10. For example, at least some functional aspects of the various embodiments described above may be implemented in any other suitable manner.

Figure 11:
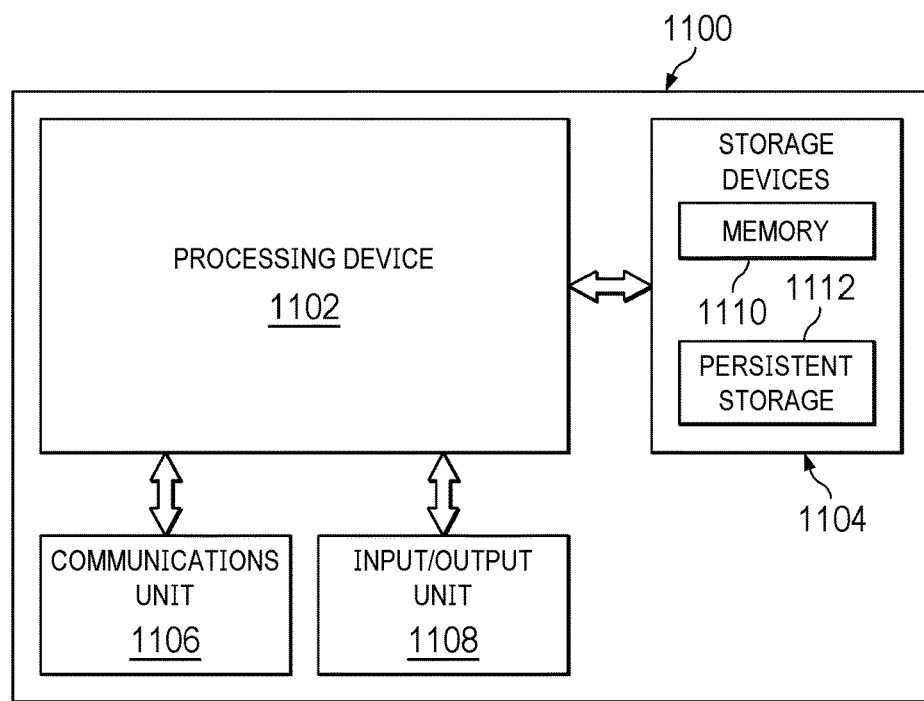
FIG. 11 illustrates an example device supporting execution of one or more tools to design hardware that implements one or more vehicle control functions according to this disclosure.

FIG. 11 illustrates an example device 1100 supporting execution of one or more tools to design hardware that implements one or more vehicle control functions according to this disclosure. The device 1100 may, for example, be used to implement at least part of the design flow 1000 shown in FIG. 10. However, the design flow 1000 may be implemented in any other suitable manner.

As shown in FIG. 11, the device 1100 denotes a computing device or system that includes at least one processing device 1102, at least one storage device 1104, at least one communications unit 1106, and at least one input/output (I/O) unit 1108. The processing device 1102 may execute instructions that can be loaded into a memory 1110. The processing device 1102 includes any suitable number(s) and type(s) of processors or other processing devices in any suitable arrangement. Example types of processing devices 1102 include one or more microprocessors, microcontrollers, digital signal processors (DSPs), application specific integrated circuits (ASICs), field programmable gate arrays (FPGAs), or discrete circuitry.

The memory 1110 and a persistent storage 1112 are examples of storage devices 1104, which represent any structure(s) capable of storing and facilitating retrieval of information (such as data, program code, and/or other suitable information on a temporary or permanent basis). The memory 1110 may represent a random access memory or any other suitable volatile or non-volatile storage device(s). The persistent storage 1112 may contain one or more components or devices supporting longer-term storage of data, such as a read only memory, hard drive, Flash memory, or optical disc.

The communications unit 1106 supports communications with other systems or devices. For example, the communications unit 1106 can include a network interface card or a wireless transceiver facilitating communications over a wired or wireless network. The communications unit 1106 may support communications through any suitable physical or wireless communication link(s).

The I/O unit 1108 allows for input and output of data. For example, the I/O unit 1108 may provide a connection for user input through a keyboard, mouse, keypad, touchscreen, or other suitable input device. The I/O unit 1108 may also send output to a display or other suitable output device. Note, however, that the I/O unit 1108 may be omitted if the device 1100 does not require local I/O, such as when the device 1100 represents a server or other device that can be accessed remotely.

The instructions that are executed by the processing device 1102 include instructions that implement at least part of the design flow 1000. For example, the instructions that are executed by the processing device 1102 may cause the processing device 1102 to generate or otherwise obtain functional designs, perform simulations, generate physical designs, verify physical designs, perform tape-outs, or create/use photomasks (or any combination of these functions). As a result, the instructions that are executed by the processing device 1102 support the design and fabrication of ASIC devices or other devices that implement one or more vehicle control functions described above.

Although FIG. 11 illustrates one example of a device 1100 supporting execution of one or more tools to design hardware that implements one or more vehicle control functions, various changes may be made to FIG. 11. For example, computing and communication devices and systems come in a wide variety of configurations, and FIG. 11 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying a path to be followed by an ego vehicle;
   determining a desired yaw rate and a desired yaw acceleration for the ego vehicle based on the identified path;
   determining a desired yaw moment for the ego vehicle based on the desired yaw rate and the desired yaw acceleration; and
   distributing the desired yaw moment to multiple wheels of the ego vehicle such that the distributed desired yaw moment creates lateral movement of the ego vehicle during travel along the identified path;
   wherein determining the desired yaw rate and the desired yaw acceleration for the ego vehicle comprises:
      determining the desired yaw rate for the ego vehicle based on a lateral offset of the ego vehicle from the identified path and a heading offset of the ego vehicle; and
      determining the desired yaw acceleration for the ego vehicle based on a rate of curvature of the identified path.

2. The method of claim 1, wherein:
   distributing the desired yaw moment to the wheels of the ego vehicle comprises at least one of (i) distributing the desired yaw moment to left and right wheels of the ego vehicle and (ii) distributing the desired yaw moment to front and rear wheels of the ego vehicle; and
   each wheel is configured to convert a portion of the desired yaw moment into a corresponding wheel torque, at least some of the wheel torques being different to create the lateral movement of the ego vehicle.

3. A method comprising:
   identifying a path to be followed by an ego vehicle;
   determining a desired yaw rate and a desired yaw acceleration for the ego vehicle based on the identified path;
   determining a desired yaw moment for the ego vehicle based on the desired yaw rate and the desired yaw acceleration; and
   distributing the desired yaw moment to multiple wheels of the ego vehicle such that the distributed desired yaw moment creates lateral movement of the ego vehicle during travel along the identified path;
   wherein determining the desired yaw rate and the desired yaw acceleration for the ego vehicle comprises determining the desired yaw rate and the desired yaw acceleration for the ego vehicle based on nonlinear kinematics of the ego vehicle; and
   wherein determining the desired yaw moment for the ego vehicle comprises determining the desired yaw moment for the ego vehicle based on a single-track dynamic model of the ego vehicle.

4. The method of claim 3, wherein determining the desired yaw rate and the desired yaw acceleration for the ego vehicle further comprises:
   projecting a reference point associated with the ego vehicle onto the identified path; and
   using the nonlinear kinematics of the ego vehicle within a vehicle-based coordinate system defined by the projection of the reference point onto the identified path.

5. The method of claim 4, wherein determining the desired yaw rate and the desired yaw acceleration for the ego vehicle further comprises using feedback linearization to determine the desired yaw rate and the desired yaw acceleration.

6. The method of claim 3, wherein the single-track dynamic model is defined by a velocity-dependent state-space model and expresses desired yaw dynamics of the ego vehicle based on lateral acceleration of the ego vehicle.

7. The method of claim 3, wherein determining the desired yaw rate and the desired yaw acceleration for the ego vehicle further comprises:
   determining the desired yaw rate for the ego vehicle based on a lateral offset of the ego vehicle from the identified path and a heading offset of the ego vehicle; and
   determining the desired yaw acceleration for the ego vehicle based on a rate of curvature of the identified path.

8. An apparatus comprising:
   at least one processing device configured to:
      identify a path to be followed by an ego vehicle;
      determine a desired yaw rate and a desired yaw acceleration for the ego vehicle based on the identified path;
      determine a desired yaw moment for the ego vehicle based on the desired yaw rate and the desired yaw acceleration; and
      distribute the desired yaw moment to multiple wheels of the ego vehicle such that the distributed desired yaw moment creates lateral movement of the ego vehicle during travel along the identified path;
   wherein the at least one processing device is configured to:
      determine the desired yaw rate and the desired yaw acceleration for the ego vehicle based on nonlinear kinematics of the ego vehicle; and
      determine the desired yaw moment for the ego vehicle based on a single-track dynamic model of the ego vehicle.

9. The apparatus of claim 8, wherein, to determine the desired yaw rate and the desired yaw acceleration for the ego vehicle, the at least one processing device is further configured to:
- project a reference point associated with the ego vehicle onto the identified path; and
- use the nonlinear kinematics of the ego vehicle within a vehicle-based coordinate system defined by the projection of the reference point onto the identified path.

10. The apparatus of claim 9, wherein the at least one processing device is configured to use feedback linearization to determine the desired yaw rate and the desired yaw acceleration for the ego vehicle.

11. The apparatus of claim 8, wherein the single-track dynamic model is defined by a velocity-dependent state-space model and expresses desired yaw dynamics of the ego vehicle based on lateral acceleration of the ego vehicle.

12. The apparatus of claim 8, wherein:
- to distribute the desired yaw moment to the wheels of the ego vehicle, the at least one processing device is configured to at least one of (i) distribute the desired yaw moment to left and right wheels of the ego vehicle and (ii) distribute the desired yaw moment to front and rear wheels of the ego vehicle; and
- each wheel is configured to convert a portion of the desired yaw moment into a corresponding wheel torque, at least some of the wheel torques being different to create the lateral movement of the ego vehicle.

13. An apparatus comprising:
at least one processing device configured to:
- identify a path to be followed by an ego vehicle;
- determine a desired yaw rate and a desired yaw acceleration for the ego vehicle based on the identified path;
- determine a desired yaw moment for the ego vehicle based on the desired yaw rate and the desired yaw acceleration; and
- distribute the desired yaw moment to multiple wheels of the ego vehicle such that the distributed desired yaw moment creates lateral movement of the ego vehicle during travel along the identified path;

wherein the at least one processing device is configured to:
- determine the desired yaw rate for the ego vehicle based on a lateral offset of the ego vehicle from the identified path and a heading offset of the ego vehicle; and
- determine the desired yaw acceleration for the ego vehicle based on a rate of curvature of the identified path.

14. The apparatus of claim 13, wherein the at least one processing device is configured to:
- determine the desired yaw rate and the desired yaw acceleration for the ego vehicle based on nonlinear kinematics of the ego vehicle; and
- determine the desired yaw moment for the ego vehicle based on a single-track dynamic model of the ego vehicle.

15. A non-transitory machine-readable medium containing instructions that when executed cause at least one processor to:
- identify a path to be followed by an ego vehicle;
- determine a desired yaw rate and a desired yaw acceleration for the ego vehicle based on the identified path;
- determine a desired yaw moment for the ego vehicle based on the desired yaw rate and the desired yaw acceleration; and
- distribute the desired yaw moment to multiple wheels of the ego vehicle such that the distributed desired yaw moment creates lateral movement of the ego vehicle during travel along the identified path;

wherein the instructions that when executed cause the at least one processor to determine the desired yaw rate and the desired yaw acceleration for the ego vehicle comprise instructions that when executed cause the at least one processor to:
- determine the desired yaw rate for the ego vehicle based on a lateral offset of the ego vehicle from the identified path and a heading offset of the ego vehicle; and
- determine the desired yaw acceleration for the ego vehicle based on a rate of curvature of the identified path.

16. The non-transitory machine-readable medium of claim 15, wherein:
the instructions that when executed cause the at least one processor to distribute the desired yaw moment to the wheels of the ego vehicle comprise:
- instructions that when executed cause the at least one processor to at least one of (i) distribute the desired yaw moment to left and right wheels of the ego vehicle and (ii) distribute the desired yaw moment to front and rear wheels of the ego vehicle; and
- each wheel is configured to convert a portion of the desired yaw moment into a corresponding wheel torque, at least some of the wheel torques being different to create the lateral movement of the ego vehicle.

17. A non-transitory machine-readable medium containing instructions that when executed cause at least one processor to:
- identify a path to be followed by an ego vehicle;
- determine a desired yaw rate and a desired yaw acceleration for the ego vehicle based on the identified path;
- determine a desired yaw moment for the ego vehicle based on the desired yaw rate and the desired yaw acceleration; and
- distribute the desired yaw moment to multiple wheels of the ego vehicle such that the distributed desired yaw moment creates lateral movement of the ego vehicle during travel along the identified path;

wherein the instructions that when executed cause the at least one processor to determine the desired yaw rate and the desired yaw acceleration for the ego vehicle comprise:
- instructions that when executed cause the at least one processor to determine the desired yaw rate and the desired yaw acceleration for the ego vehicle based on nonlinear kinematics of the ego vehicle; and wherein the instructions that when executed cause the at least one processor to determine the desired yaw moment for the ego vehicle comprise:
- instructions that when executed cause the at least one processor to determine the desired yaw moment for the ego vehicle based on a single-track dynamic model of the ego vehicle.

18. The non-transitory machine-readable medium of claim 17, wherein the instructions that when executed cause the at least one processor to determine the desired yaw rate and the desired yaw acceleration for the ego vehicle further comprise:
instructions that when executed cause the at least one processor to:

determine the desired yaw rate for the ego vehicle based on a lateral offset of the ego vehicle from the identified path and a heading offset of the ego vehicle; and determine the desired yaw acceleration for the ego vehicle based on a rate of curvature of the identified path.

19. The non-transitory machine-readable medium of claim 17, wherein the instructions that when executed cause the at least one processor to determine the desired yaw rate and the desired yaw acceleration for the ego vehicle further comprise:

instructions that when executed cause the at least one processor to:

project a reference point associated with the ego vehicle onto the identified path; and use the nonlinear kinematics of the ego vehicle within a vehicle-based coordinate system defined by the projection of the reference point onto the identified path.

20. The non-transitory machine-readable medium of claim 19, wherein the instructions that when executed cause the at least one processor to determine the desired yaw rate and the desired yaw acceleration for the ego vehicle further comprise:

instructions that when executed cause the at least one processor to determine the desired yaw rate and the desired yaw acceleration for the ego vehicle using feedback linearization.

21. The non-transitory machine-readable medium of claim 17, wherein the single-track dynamic model is defined by a velocity-dependent state-space model and expresses desired yaw dynamics of the ego vehicle based on lateral acceleration of the ego vehicle.

22. A method comprising:

identifying a path to be followed by an ego vehicle;

determining a desired yaw rate and a desired yaw acceleration for the ego vehicle based on the identified path;

determining a desired yaw moment for the ego vehicle based on the desired yaw rate and the desired yaw acceleration; and distributing the desired yaw moment to multiple wheels of the ego vehicle such that the distributed desired yaw moment creates lateral movement of the ego vehicle during travel along the identified path;

wherein the desired yaw moment for the ego vehicle is determined using the desired yaw rate, the desired yaw acceleration, an actual yaw rate of the ego vehicle, a moment of inertia of the ego vehicle, a front road wheel angle of the ego vehicle, and a lateral acceleration of the ego vehicle.

* * * * *